US009574949B2

(12) United States Patent
Belli et al.

(10) Patent No.: US 9,574,949 B2
(45) Date of Patent: Feb. 21, 2017

(54) AUTOMATED SYSTEM AND METHOD FOR TESTING THE EFFICACY AND RELIABILITY OF DISTRIBUTED TEMPERATURE SENSING SYSTEMS

(75) Inventors: Riccardo Belli, Porza (CH); Daniele Inaudi, Lugano (CH)

(73) Assignee: ROCTEST LTD (CA)

( * ) Notice: Subject to any disclaimer, the term of this patent is extended or adjusted under 35 U.S.C. 154(b) by 88 days.

(21) Appl. No.: 13/398,905

(22) Filed: Feb. 17, 2012

(65) Prior Publication Data
US 2013/0215926 A1 Aug. 22, 2013

(51) Int. Cl.
*G01N 3/00* (2006.01)
*G01J 5/08* (2006.01)
*G01K 11/32* (2006.01)
*G01K 15/00* (2006.01)

(52) U.S. Cl.
CPC ............ *G01K 11/32* (2013.01); *G01K 15/007* (2013.01)

(58) Field of Classification Search
CPC .......... G01N 25/00; G01N 3/00; G01K 11/00; G01K 11/32; G01K 1/14; G01K 11/12; G01K 1/143; G01J 5/08; G01J 5/0821
USPC ........... 374/4, 5, 1, 141, 130–132, 120, 161, 374/45–49, 137, 110–112, 136, 57; 356/43, 34
See application file for complete search history.

(56) References Cited

U.S. PATENT DOCUMENTS

| 4,313,344 A | 2/1982 | Brogardh |
| 4,767,219 A | 8/1988 | Bibby |
| 4,785,174 A * | 11/1988 | Hodges et al. ............ 250/338.1 |
| 4,812,645 A * | 3/1989 | Griffiths .................... 250/227.14 |
| 4,823,166 A | 4/1989 | Hartog et al. |
| 5,308,162 A | 5/1994 | Amano |
| 5,563,967 A | 10/1996 | Haake |

(Continued)

FOREIGN PATENT DOCUMENTS

| DE | 10 2008 031975 A1 | 6/2009 |
| DE | 10 2008 031875 A1 | 1/2010 |

(Continued)

OTHER PUBLICATIONS

International Search Report and Written Opinion prepared in connection with PCT/CA2012/000150, Oct. 18, 2012.

(Continued)

*Primary Examiner* — Gail Kaplan Verbitsky
(74) *Attorney, Agent, or Firm* — Robert V. Donahoe; Rhodes Donahoe, LLC

(57) ABSTRACT

Automated systems and methods for testing the efficacy and reliability of distributed temperature sensing (DTS) system. The DTS system has a fiber optic sensing cable laid out on a structure to be monitored, and a DTS unit for sensing temperature along a sensing line at locations thereof. The DTS unit is optically coupled to the sensing cable. The sensing cable is optically coupled to a test cable to form the sensing line. Also provided, is a cooling device for cooling the test cable. A controller periodically actuates the cooling device to thereby test the efficacy and reliability of the DTS system. A relay configured for communication with the DTS unit and the controller is operable to trigger an alarm condition in response to a signal received from the DTS unit indicative that a temperature drop in the sensing line at a location thereof has been detected.

49 Claims, 8 Drawing Sheets

(56) References Cited

U.S. PATENT DOCUMENTS

| | | | |
|---|---|---|---|
| 5,821,861 A | 10/1998 | Hartog et al. | |
| 5,902,043 A * | 5/1999 | Price | G01K 17/08 374/1 |
| 6,069,686 A | 5/2000 | Wang | |
| 6,098,473 A * | 8/2000 | Hafner | G05D 23/1919 198/817 |
| 6,380,534 B1 | 4/2002 | Farhandiroushan | |
| 6,547,435 B1 | 4/2003 | Grosswig | |
| 6,769,805 B2 | 8/2004 | Williams | |
| 6,807,324 B2 | 10/2004 | Pruett | |
| 6,817,759 B2 * | 11/2004 | Chi et al. | 374/137 |
| 6,913,079 B2 | 7/2005 | Tubel | |
| 7,030,974 B2 | 4/2006 | Spirin et al. | |
| 7,085,457 B2 | 8/2006 | Lancaster | |
| 7,197,199 B2 | 3/2007 | Cuypers | |
| 7,215,416 B2 | 5/2007 | Yamate | |
| 7,350,972 B2 | 4/2008 | Seebacher | |
| 7,355,163 B2 | 4/2008 | Watley | |
| 7,356,426 B2 * | 4/2008 | Jain | G01K 3/005 327/378 |
| 7,397,976 B2 | 7/2008 | Mendez | |
| 7,412,117 B2 * | 8/2008 | Chen | G01K 11/32 374/E11.015 |
| 7,504,618 B2 | 3/2009 | Hartog | |
| 7,509,008 B2 | 3/2009 | Perales | |
| 7,526,149 B1 | 4/2009 | MacDougall | |
| 7,526,397 B2 | 4/2009 | Kalar | |
| 7,529,434 B2 | 5/2009 | Taverner | |
| 7,561,771 B2 | 7/2009 | Jaaskelainen | |
| 7,730,936 B2 | 6/2010 | Hernandez-Solis | |
| 7,744,275 B2 | 6/2010 | Kawauchi | |
| 7,874,725 B2 | 1/2011 | Komeda et al. | |
| 8,318,131 B2 * | 11/2012 | McAlister | F01N 5/02 252/373 |
| 8,740,455 B2 * | 6/2014 | Hall | 374/136 |
| 9,020,419 B2 * | 4/2015 | Gaines | A61B 5/0022 370/242 |
| 2003/0103552 A1 * | 6/2003 | Chi et al. | 374/137 |
| 2005/0078922 A1 | 4/2005 | Sanders | |
| 2005/0113890 A1 | 5/2005 | Ritchie | |
| 2006/0153274 A1 * | 7/2006 | Seebacher | 374/130 |
| 2006/0225507 A1 | 10/2006 | Paulson | |
| 2008/0232425 A1 | 9/2008 | Hall | |
| 2008/0297358 A1 * | 12/2008 | Kim | G01K 3/005 340/595 |
| 2009/0132183 A1 | 5/2009 | Hartog | |
| 2009/0240455 A1 * | 9/2009 | Fromme et al. | 702/85 |
| 2009/0252193 A1 | 10/2009 | Hill | |
| 2010/0074572 A1 | 3/2010 | Zheng | |
| 2010/0128756 A1 | 5/2010 | Lee | |
| 2010/0220765 A1 | 9/2010 | Martinelli | |
| 2010/0269941 A1 | 10/2010 | Hara | |
| 2010/0276576 A1 | 11/2010 | Martinelli | |
| 2010/0315630 A1 | 12/2010 | Ramos | |
| 2011/0007996 A1 | 1/2011 | Huffman | |
| 2011/0044371 A1 * | 2/2011 | Lee | 374/161 |
| 2011/0088462 A1 | 4/2011 | Samson | |
| 2011/0144790 A1 | 6/2011 | Gerritsen | |
| 2011/0308788 A1 | 12/2011 | Ravi et al. | |
| 2011/0320147 A1 | 12/2011 | Brady et al. | |
| 2013/0100984 A1 * | 4/2013 | Agawa | 374/161 |
| 2013/0156066 A1 * | 6/2013 | Kwon et al. | 374/161 |
| 2013/0267795 A1 * | 10/2013 | Cosentino | A61B 5/0002 600/301 |
| 2014/0206948 A1 * | 7/2014 | Romem | A61B 5/0022 600/301 |

FOREIGN PATENT DOCUMENTS

| | | |
|---|---|---|
| EP | 1698890 B1 | 10/2008 |
| GB | 2461191 A | 12/2009 |
| JP | 03120437 A * | 5/1991 |
| WO | 2011141537 A1 | 11/2011 |

OTHER PUBLICATIONS

Third party "Filing of Prior Art" dated Mar. 26, 2015 filed in corresponding Canadian Application No. 2,805,811.
European Search Report dated Nov. 5, 2014 for corresponding European Application No. 128824682.4.
Examination Report from corresponding European patent application No. 12 824 682A-1555 (dated Sep. 9, 2016).

* cited by examiner

AUTOMATED SYSTEM AND METHOD FOR TESTING THE EFFICACY AND RELIABILITY OF DISTRIBUTED TEMPERATURE SENSING SYSTEMS

FIELD OF THE INVENTION

The present invention relates generally to distributed temperature sensing systems, and more specifically, to an automated system and method for testing the efficacy and reliability of distributed temperature sensing (DTS) systems, in particular, those DTS systems used for pipeline leakage detection.

BACKGROUND OF THE INVENTION

Distributed fibre optic temperature sensing systems are currently being employed in the field to monitor fluid-carrying pipelines and detect leaks therein. In a typical deployment, a distributed temperature sensing (DTS) system includes fibre optic sensing cables laid out in a sensing line that runs on or alongside sections of the pipeline to be monitored and a DTS unit to which the sensing cables are optically coupled. The DTS unit emits pulses of light through the sensing cables and receives backscattered light signals. These light signals are processed using ODTR techniques (Optical Time Domain Reflectometry) to derive therefrom temperature values associated with locations along the sensing line.

In a gas-carrying or liquefied gas-carrying pipeline, when a leak occurs at a location along the sensing line the DTS system will generally detect a localized temperature drop or "cold spot". The gaseous substance flowing through the pipeline is cooled down by the pressure release through the leaking pipe section and cools the pipe section and the surrounding area. In some cases, it is also possible to observe a hot-spot when a leak occurs in a gas-carrying pipeline, for example, in a pipeline carrying water vapor.

In a liquid-carrying pipeline, when a leak occurs at a location along the sensing line the DTS system will generally detect a localized temperature rise or "hot spot". The liquid substance flowing through the pipeline is typically warmer than the structures adjacent the sensing line such that when the liquid escapes from the pipeline it tends to warm such structures. In some cases, it is also possible to observe a cold-spot in the case of leaks from a liquid-carrying pipeline, for example, if the transported liquid is colder than the environment.

Such DTS systems have the advantage of being scalable and relatively easy to deploy over long pipeline sections. Moreover, such systems have been shown to detect leakage events with good accuracy and reliability. However, as with all safety systems, it is important to be able to assess the reliability of the DTS system and to test whether the DTS system is functioning properly. In the past, such assessment and testing have been performed periodically on annual or quarterly basis by pipeline personnel. Such periodic testing typically involves a worker manually exposing the sensing line to a cooling or heating source to produce a localized cold or hot spot. This is not unlike the periodic testing performed in fire detection systems and LNG pipelines.

It would be advantageous to be able to assign a Safety Integrity Level (SIL) or equivalent confidence level to such DTS systems. However, in order for the DTS system to be SIL-certified, certain requirements have to be met, inter alia, targets for maximum probability of a dangerous failure. These requirements can be complied with by establishing a rigorous development and documentation process, or by establishing that the system has sufficient operating history to demonstrate that it has been proven in use. In some cases, due to the complexity of software used to operate DTS systems, it may not be possible to demonstrate compliance with SIL certification requirements by way of a rigorous development and documentation process. Accordingly, in such cases, the only way to show compliance with SIL certification or equivalent confidence level requirements is through extensive proof of use. With current testing of the DTS systems being performed manually only a few times a year, it is difficult to generate the data required to evidence the DTS system's reliability through proven use.

Based on the foregoing, it would be advantageous if a DTS system could be provided with an independent testing system that could easily be incorporated into a sensing line and that would be operable to test the reliability and functionality of the DTS system on a relatively high-frequency basis in a continuous and autonomous manner.

SUMMARY OF THE INVENTION

In accordance with one broad aspect of the present invention, there is provided a distributed sensing system having at least one fibre optic sensing cable laid out on or along a structure to be monitored, and a distributed sensing unit for sensing along a sensing line at least one physical parameter associated with the sensing line at a location thereof. The at least one physical parameter is selected from the group consisting of: (a) temperature; (b) strain; and (c) temperature and strain. The distributed sensing system is optically coupled to the at least one fibre optic sensing cable. At least one fibre optic test cable is optically coupled to the at least one sensing cable to form the sensing line. Also provided, is at least one device arranged relative to the at least one test cable to induce a change in the at least one physical parameter associated with the at least one test cable. The change is detectable by the distributed sensing unit. The distributed sensing system further includes a controller for periodically actuating the at least one change-inducing device to thereby test the efficacy and reliability of the distributed sensing unit. A relay is configured for communication with the distributed sensing unit and the controller. The relay is operable to trigger an alarm condition in response to a signal received from the distributed sensing unit indicative that a change in the at least one physical parameter associated with the sensing line at a location thereof has been detected. The controller is operable to monitor the response of the distributed sensing unit to the change in the at least one physical parameter associated with the at least one test cable based on input received from the relay or the lack thereof.

In one feature, the at least one physical parameter includes temperature and the at least one change-inducing device is selected from the group consisting of: (a) a cooling device; (b) a heating device; and (c) a strain-inducing devices.

In another feature, the at least one change-inducing device is a temperature change-inducing device. The at least one temperature change-inducing device is selected from the group consisting of: (a) a cooling device; and (b) a heating device. Optionally, the at least one temperature change-inducing device is a cooling device selected from the group consisting of: (a) a Peltier cooler; (b) a gas-based cooling device; and (c) a liquid-based cooling device. Alternatively, the at least one temperature change-inducing device is a heating device selected from the group consisting of: (a) a Peltier heater; (b) a gas-based heating device; (c) a liquid-based heating device; (d) a burner; and (e) an electrical resistance heater.

In an additional feature, the at least one temperature change-inducing device is disposed in heat exchange relation with the at least one test cable. The at least one test cable cooperates with the at least one cable temperature change-inducing device to define at least one testing station. The at least one testing station is disposed along the sensing line at a location away from the structure to be monitored.

In a further feature, the at least one test cable includes first and second test cables. The at least one temperature change-inducing device includes first and second temperature change-inducing devices. The first temperature change-inducing device is disposed in heat exchange relation with the first test cable. The second temperature change-inducing device is disposed in heat exchange relation with the second test cable. The at least one testing station includes first and second testing stations. The first testing station is defined by the first test cable in cooperation with the first temperature change-inducing device. The second testing station is defined by the second test cable in cooperation with the second temperature change-inducing device. The first and second testing stations are disposed along the sensing line at different locations.

In another feature, the at least one temperature change-inducing device is a single temperature change-inducing device. The at least one test cable includes a first test cable and a second test cable. The at least one testing station includes first and second testing stations. The first testing station is defined by the first test cable in cooperation with the single temperature change-inducing device. The second testing station is defined by the second test cable in cooperation with the single temperature change-inducing device.

In yet another feature, a length of the at least one test cable is supported on a spool. The length of the at least one test cable supported on the spool measures between 0.5 m and 2.0 m. Optionally, the length of the at least one test cable supported on the spool is matched to the spatial resolution of the distributed sensing unit.

In still another feature, the sensing line has a loop configuration. The at least one sensing cable includes first, second and third sensing cables. The at least one test cable includes first and second test cables. The first sensing cable is disposed between the distributed sensing unit and the first test cable. The second sensing cable is disposed between the first test cable and the second test cable. The third sensing cable is disposed between the second test cable and the distributed sensing unit. In an additional feature, the sensing line is configured for one of single-ended interrogation and double-ended interrogation.

In a different feature, the sensing line has a first end and a second end. Only the first end of the sensing line is connected to the distributed sensing unit.

In yet another feature, the distributed sensing unit is operable to: (a) emit pulses of light for transmission through the sensing line; (b) receive light signals from the sensing line; and (c) derive from the light signals received the at least one physical parameter associated with the sensing line at a location thereof. The light signals received are light signals selected from the group consisting of: (a) Raman scattered light signals; (b) Brillouin scattered light signals; and (c) Rayleigh scattered light signals.

In an additional feature, the controller includes a timer to measure the time elapsed between the occurrence of the change in the at least one physical parameter associated with the at least one test cable and the detection thereof by the distributed sensing unit.

In one feature, the at least one physical parameter is temperature. The distributed sensing system further includes at least one temperature sensor for measuring the temperature of the at least one test cable. The temperature sensor is configured for communication with the controller.

In another feature, the at least one test cable includes first and second test cables. The at least one change-inducing device includes first and second cooling devices. The controller is operable to actuate the first cooling device to cool the first test cable to a first predetermined temperature range and the second cooling device to cool the second test cable to a second predetermined temperature range. The first predetermined temperature range is the same as the second predetermined temperature range. In an alternate feature, the first predetermined temperature range is different than the second predetermined temperature range.

In still another feature, the at least one test cable includes first and second test cables. The at least one change-inducing device includes first and second temperature change-inducing devices. The controller is operable to actuate the first and second temperature change-inducing devices at random time intervals. Alternatively, the controller is operable to actuate the first and second temperature change-inducing devices contemporaneously. In still a further feature, the controller is operable to actuate the first temperature change-inducing device at a first time interval and the second temperature change-inducing device at a second time interval. The first time interval and the second time interval are the same. Alternatively, the first time interval and the second time interval are staggered from each other.

In accordance with another broad aspect of the present invention, there is provided a kit for a distributed sensing system. The kit includes at least one fibre optic sensing cable for laying out on or along a structure to be monitored, and a distributed sensing unit for sensing along a sensing line at least one physical parameter associated with the sensing line at a location thereof. The at least one physical parameter is selected from the group consisting of: (a) temperature; (b) strain; and (c) temperature and strain. The distributed sensing system is optically couplable to the at least one sensing cable. At least one fibre optic test cable is optically couplable to the at least one sensing cable to form the sensing line. At least one device is arrangeable relative to the at least one test cable to induce a change in the at least one physical parameter associated with the at least one test cable. Also provided, is a controller for periodically actuating the at least one change-inducing device to thereby test the efficacy and reliability of the distributed sensing unit. A relay configurable for communication with the distributed sensing unit and the controller. When the sensing line is operatively deployed, the relay is operable to trigger an alarm condition in response to a signal received from the distributed sensing unit indicative that a change in the at least one physical parameter associated with the sensing line at a location thereof has been detected, and the controller is operable to monitor the response of the distributed sensing unit to the change in the at least one physical parameter associated with the at least one test cable based on input received from the relay or the lack thereof.

In accordance with another broad aspect of the present invention, there is provided an automated method for testing the reliability and the efficacy of a distributed sensing system deployed on a structure to be monitored. The method includes the steps of: (a) emitting from a distributed sensing unit pulses of light through a sensing line formed by at least one fibre optic sensing cable laid out on or along a structure to be monitored and at least one fibre optic test cable optically coupled to the at least one sensing cable; and (b) actuating at least one device arranged relative to the at least one test cable so as to induce a change in the at least one physical parameter associated with the at least one test cable. The at least one physical parameter associated with the at least one test cable is selected from the group consisting of: (i) temperature; (ii) strain; and (iii) temperature and strain. The method further includes the steps of: (c) receiving, at the distributed sensing unit, backscattered light signals associated with locations along the sensing line; (d) deriving from the light signals received the at least one physical parameter associated with locations along the sensing line; (e) determining whether a change in the at least one physical parameter associated with the sensor line at a location thereof has been detected by the distributed sensing unit within a predetermined time period; (f) triggering an alarm condition indicative of the occurrence of a malfunction in the distributed sensing system, if no change has been detected within the predetermined time period; (g) if a change has been detected within the predetermined time period, determining whether the change detected is associated with the at least one test cable; (h) calculating the reaction time of the distributed sensing system, if the change detected is associated with the at least one test cable; and (i) triggering an alarm condition indicative of the occurrence of a sensing event at a location along the structure being monitored, if the change detected is associated with the at least one sensing cable.

In one feature, the method further includes, following the performance of the calculating step, the step of de-energizing the at least one change-inducing device to reverse the change in the at least one physical parameter associated with the at least one test cable. The method further includes, following the performance of the de-energizing step, the step of repeating step (a) through step (i).

In another feature, the at least one sensing cable includes first, second and third sensing cables. The at least one test cable includes first and second test cables. The first sensing cable is disposed between the distributed sensing unit and the first test cable. The second sensing cable is disposed between the first test cable and the second test cable. The third sensing cable is disposed between the second test cable and the distributed sensing unit.

In a further feature, the at least one change-inducing device includes a first temperature change-inducing device and a second temperature change-inducing device. The actuating step includes actuating the first temperature change-inducing device and the second temperature change-inducing simultaneously. Alternatively, the actuating step includes actuating the first temperature change-inducing device and the second temperature change-inducing device at staggered time intervals.

In an additional feature, the at least one change-inducing device includes at least one cooling device. The method further includes, following the actuating step, the step of cooling the at least one test cable.

In a different feature, the at least one change-inducing device includes at least one heating device. The method further includes, following the actuating step, the step of heating the at least one test cable.

In a yet another feature, the at least one change-inducing device includes at least one strain-inducing device. The method further includes, following the actuating step, the step of inducing strain in the at least one test cable.

In still another feature, the light signals received at the distributed sensing unit are light signals selected from the group consisting of: (i) Raman scattered light signals; (ii) Brillouin scattered light signals; and (iii) Rayleigh scattered light signals.

In accordance with yet another broad aspect of the present invention, there is provided an automated method for testing the efficacy and reliability of a distributed temperature sensing system used in a fluid leakage detection application. The method includes the steps of: (a) emitting from a distributed sensing unit pulses of light through a sensing line formed by at least one fibre optic sensing cable laid out on or along a structure to be monitored for leakage of fluid and at least one fibre optic test cable optically coupled to the at least one sensing cable; and (b) actuating at least one device arranged relative to the at least one test cable so as to induce a change in temperature in the at least one test cable. The change in temperature in the at least one test cable is intended to mimic the temperature change which would be produced on the sensing line in the event of a leakage of fluid. The method further including the steps of: (c) receiving, at the distributed sensing unit, light signals associated with locations along the sensing line; (d) deriving from the light signals received the temperature associated with locations along the sensing line; (e) determining whether a change in temperature associated with the sensor line at a location thereof has been detected by the distributed sensing unit within a predetermined time period; (f) triggering an alarm condition indicative of the occurrence of a malfunction in the distributed sensing system, if no temperature change has been detected within the predetermined time period; (g) if a temperature change has been detected within the predetermined time period, determining whether the temperature change detected is associated with the at least one test cable; (h) calculating the reaction time of the distributed sensing system, if the temperature change detected is associated with the at least one test cable; and (i) triggering an alarm condition indicative of the occurrence of a fluid leakage event at a location along the structure being monitored, if the temperature change detected is associated with the at least one sensing cable.

In one feature, the fluid is a gas. The at least one temperature change-inducing device is a cooling device. The actuating step includes actuating the cooling device to cool the at least one test cable. The change in temperature is a drop in temperature. In another feature, the structure being monitored is a gas-carrying pipeline.

In an alternate feature, the fluid is a liquid. The at least one temperature change-inducing device is a heating device. The actuating step includes actuating the heating device to heat the at least one test cable. The change in temperature is a rise in temperature. In yet another feature, the structure being monitored is selected from the group consisting of: (i) a dams; (ii) a levee; (iii) a reservoir; (iv) a pool; (v) a storage tank; (vi) a basin; (vii) a ship hull; (viii) a tunnel; and (ix) a mine shaft.

BRIEF DESCRIPTION OF THE DRAWINGS

The embodiments of the present invention shall be more clearly understood with reference to the following detailed description of the embodiments of the invention taken in conjunction with the accompanying drawings, in which.

DETAILED DESCRIPTION OF THE EMBODIMENTS OF THE INVENTION

Figure 1:
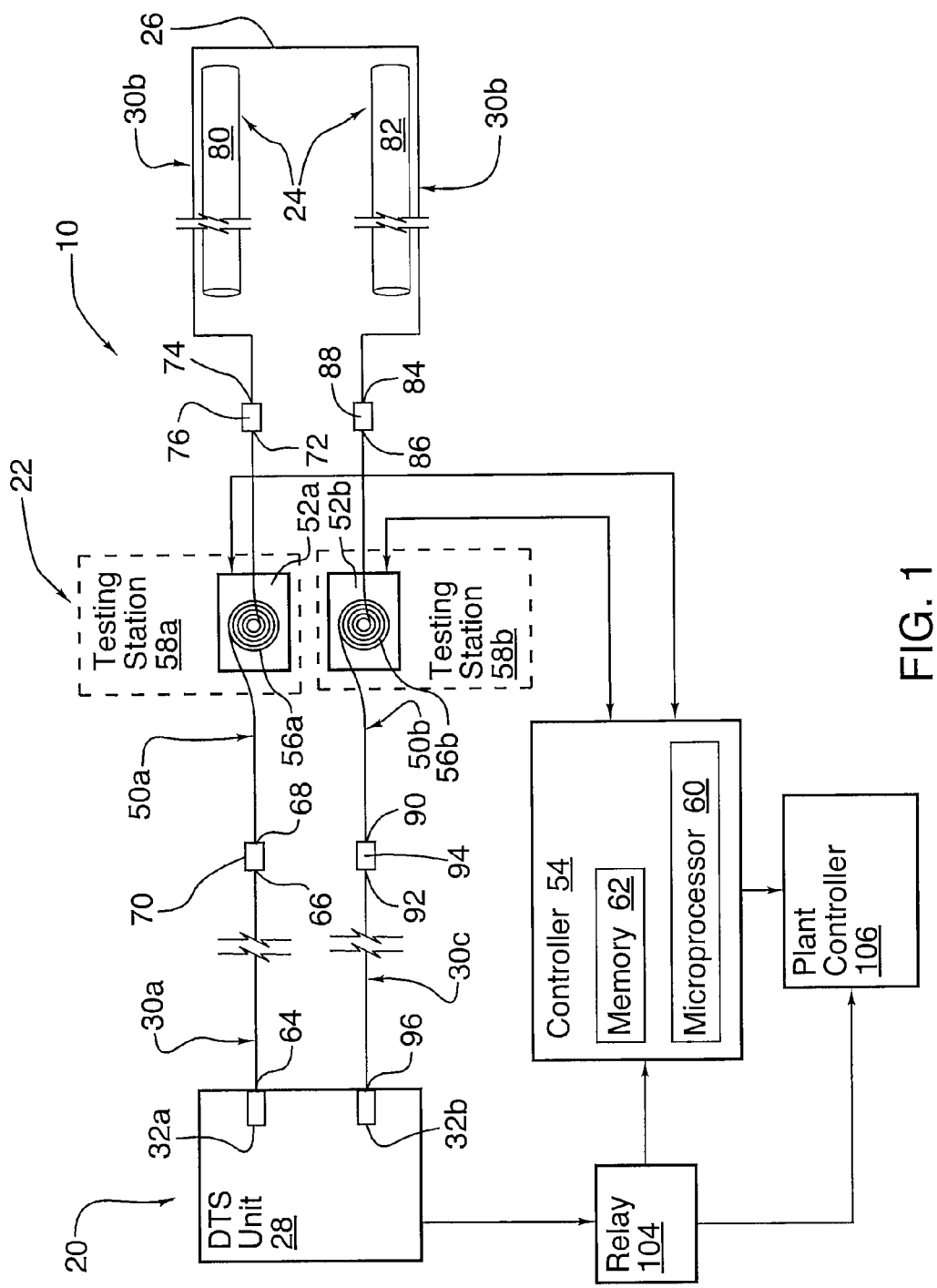
FIG. 1 illustrates an distributed temperature sensing system having an automated testing system connected to a distributed temperature sensing subsystem deployed on a gas-carrying pipeline to form a single sensing line, in accordance with an embodiment of the present invention.

The description which follows, and the embodiments described therein are provided by way of illustration of an example, or examples of particular embodiments of principles and aspects of the present invention. These examples are provided for the purposes of explanation and not of limitation, of those principles of the invention. In the description that follows, like parts are marked throughout the specification and the drawings with the same respective reference numerals.

Referring to FIG. 1, there is shown a distributed temperature sensing (DTS) system designated generally with reference numeral 10. The DTS system 10 includes a DTS subsystem 20 and an automated testing system 22. In the preferred embodiment, the automated testing system 22 is designed to test the efficacy and reliability of the DTS subsystem 20 deployed along a pipeline 24 by simulating, in an automated manner, a relatively high frequency of leakage conditions along a sensing line 26 which are detectable by the DTS subsystem 20 and monitoring the response of the DTS subsystem 20 to such simulated leakage conditions. In this embodiment, the automated testing system 22 and the DTS subsystem 20 are deployed on pipeline 24 carrying a gaseous substance. In other embodiments, the pipeline could be carrying a liquid substance.

In this embodiment, the DTS subsystem 20 includes a DTS unit 28 and a plurality of temperature sensing cables (generically identified with reference numeral 30) for optically coupling to the DTS unit 28. Optionally, the DTS subsystem 20 could also include a multiplexer, a display device (e.g. a monitor), one or more input devices (e.g. keyboard, mouse or touchpad) and/or a network device; all connectable to the DTS unit 28.

The DTS unit 28 may be any suitable device for receiving and/or processing temperature dependent light signals. In this embodiment, the DTS unit 28 includes: a plurality of connectors (generically identified with reference numeral 32) for optically coupling temperature sensing cables 30 to the DTS unit 28; a light source 34 capable of emitting pulses of light, or otherwise modulating it, for transmission along the sensing line 26 (including the coupled temperature sensing cables 30); a receiver or reader 36 capable of receiving light signals from the sensing line (including the coupled temperature sensing cables 30) (i.e. backscattered light) and converting such light signals to electrical signals; a microprocessor 38 capable of determining temperature values based on the electrical signals received from the receiver 36; and memory 40 for storing the software application containing the instructions executed by the microprocessor 38, and the temperature data generated by the microprocessor 38. Also provided, are directional couplers 42 to couple the backscattered light signals to the receiver 36. In certain embodiments, the DTS unit could also include a multiplexer module and/or other components.

In this embodiment, the plurality of connectors 32 includes a first connector 32a and a second connector 32b. In other embodiments, the plurality of connectors could include a greater number of connectors.

An example of a DTS unit which would be suitable for use with an embodiment of the present invention is the HALO-DTS™ system made commercially available by Sensornet Limited of Hertfordshire, United Kingdom. In alternative embodiments, other DTS units could be used. The sensing capabilities of such DTS units could also be based on distributed Raman scattering, or still other light scattering phenomena, including, for example, distributed Brillouin scattering or distributed Rayleigh scattering.

In this embodiment, the plurality of temperature sensing cables 30 includes first, second and third temperature sensing cables 30a, 30b and 30c, respectively. In other embodiments, the plurality of temperature sensing cables could include a greater or lesser number of cables. As will be explained in greater detail below, the first and third temperature sensing cables 30a and 30c serve to optically couple the DTS unit 28 to the automated testing system 22. The second temperature sensing cable 30b is deployed on or alongside sections of the pipeline 24 and is optically coupled to the automated testing system 22.

Preferably, each temperature sensing cable 30 includes at least one centrally disposed optical fibre which may be protected by a combination of coatings, sheaths and/or armouring wires. The optical fibre may be a single mode optical fibre or a multi-mode optical fibre. It may be made from any suitable material that allows a sufficient level of scattering intensity for the distributed temperature measurements. An example of a temperature sensing cable which would be suitable for use with an embodiment of the present invention is the DiTemp™ temperature sensing cables made commercially available by Smartec S.A. of Manno, Switzerland.

Referring to FIG. 1, the automated testing system 22 includes a plurality of test temperature sensing cables (generically identified with reference numeral 50), a pair of cooling devices 52a and 52b for cooling sections of the test cables 50, and a controller 54 for actuating the cooling devices 52a and 52b.

In this embodiment, the plurality of test cables 50 includes a first test cable 50a and a second test cable 50b. In other embodiments, the plurality of test cables could include a greater or lesser number of cables. Each test cable 50a, 50b contains a sensing optical fibre similar to sensing optical fibre contained in the temperature sensing cables 30 described above. However, in contrast, to the temperature sensing cables 30, the test cables 50a and 50b do not have protective sheaths or armouring wires. While it is generally preferred that the each test cable 50a, 50b be a single unbroken length of cable, it will be appreciated that in certain embodiments it may desirable to have the test cable made up of two or more sections of cable coupled together via an external splice or connector.

Portions of the first and second test cables 50a and 50b are carried on spools 56a and 56b, respectively. Preferably, each spool 56a, 56b supports a length of test cable equivalent to the shortest length expected to be effected by a leakage event occurring along the pipeline being monitored, typically between 0.50 m and 2.0 m. In this embodiment, the spools 56a and 56b each support about 1.0 m of test cable. Although, in other embodiments, different lengths of test cable could be accommodated on a spool. The length of the test cable may also be matched to the spatial resolution of the DTS unit. The first spool 56a is disposed in heat exchange relation with the first cooling device 52a; whereas the second spool 56b is arranged in heat exchange relation with the second cooling device 52b. In an alternative embodiment, the test cables could be disposed in heat exchange relation with the cooling devices without the use of spools.

Preferably, the cooling devices 52a and 52b are thermoelectric cooling devices (also known as Peltier coolers) and operable to cool the test cables 50a and 50b, respectively, to have temperature profiles similar to that which would be produced if the test cables were exposed to a gas leak. In alternative embodiments, the cooling devices could take the form of gas or liquid-based cooling devices. For example, in one embodiment, the cooling device could use as its cooling medium the same gas as the one carried in the pipeline. In another embodiment, the cooling device could take the form of a vessel into which may be introduced the test cable. An electro-valve could be provided to regulate the flow of a compressed gas through an orifice into the vessel. In a further alternative, the testing cable could be placed in a chamber, where a cooled liquid is circulated. In this embodiment, the automated testing system 22 includes two cooling devices 52a and 52b. In other embodiments, a greater number of cooling devices could be provided. In still other embodiments, the automated testing system could be provided with a single cooling device. In such embodiments, the single cooling device could be configured to cool a single test cable or alternatively, it could be configured to cool two test cables.

The first cooling device 52a and the first test cable 50a cooperatively define a first testing station 58a. Similarly, the second cooling device 52b and the second test cable 50b cooperatively define a second testing station 58b. The first and second testing stations 58a and 58b may be deployed at different location along the sensing line 26.

The controller 54 may be any suitable device for actuating the cooling devices 52a and 52b. In certain applications, it may be desirable for the controller to be SIL (Safety Integrity Level)-rated. In certain applications, it might be further desirable the controller to include a 1oo2 or 2oo3 voting system.

The controller 54 is programmed to actuate each of the cooling devices 52a and 52b at predetermined times or time intervals (for example, every 15 minutes, or every hour) to cool the test cables 50a and 50b to one or more predetermined temperatures (or temperature ranges) thereby mimicking the cooling temperature effect which a temperature sensing cable would experience as a result of being exposed to gas leaking from the pipeline 24. Such temperatures or temperature ranges could be determined from numeric simulations or from leakage tests performed on the pipeline. Preferably, the cooling devices 52a and 52b are actuated simultaneously. Alternatively, in certain applications, the time intervals at which the controller 54 actuates the cooling device 52a could be staggered from the time intervals at which the controller 54 actuates the cooling device 52b. For example, if the controller 54 is programmed to actuate the cooling devices 52a and 52b twice in a one (1) hour period, the controller 54 could actuate the cooling devices 52a and 52b at half hour intervals. In still other embodiments, the controller could be programmed to actuate each of the cooling devices at random time intervals.

The controller 54 is programmed to cause the first cooling device 52a to cool the first test cable 50a to a first predetermined temperature (or temperature range) and the second cooling device 52b to cool the second test cable 50b to a second predetermined temperature (or temperature range). Preferably, the first and second predetermined temperatures (or temperature ranges) are the same. In other embodiments, the first predetermined temperature (or temperature range) could be different than the second predetermined temperature (or temperature range).

The controller 54 also includes a microprocessor 60 and memory 62. As explained in greater detail below, the memory 62 is configured to store data generated from the occurrence of a simulated leakage event resulting from the actuation of the cooling devices 52a and 52b. Optionally, the controller could also include a timer to measure the time elapsed between the occurrence of a simulated leakage event and the detection of the simulated leakage event by the DTS subsystem 20.

Optionally, the automated testing system 22 could also include temperature sensors for measuring the temperature of each of the test cables 50a and 50b. Such temperature sensors would be configured for communication (e.g. wired or wireless communication) with the controller 54.

An exemplary deployment of the DTS subsystem 20 and the automated testing system 22 on pipeline 24 is now described in greater detail with reference to FIG. 1. In this embodiment, the sensing line 26 is defined by the first temperature sensing cable 30a, the first test cable 50a, the second temperature sensing cable 30b, the second test cable 50b and the third temperature sensing cable 30c; all optically coupled to each other. In other embodiments, the sensing line could include extension (or interconnect) cables and/or a greater or lesser number of temperature sensing cables and/or test cables. For instance, it may be possible to replace temperature sensing cables 30a and 30c with extension (or interconnect) cables.

The particular arrangement of temperature sensing cables and test cables in sensing line 26 is as follows. The first temperature sensing cable 30a extends between the DTS unit 28 and the first test cable 50a. More specifically, the first temperature sensing cable 30a is optically coupled at a first end 64 thereof to the first connector 32a of the DTS unit 28, and at a second end thereof 66 to the first end 68 of the first test cable 50a via a third connector 70. The first test cable 50a runs between the first temperature sensing cable 30a and the second temperature sensing cable 30b. The second end 72 of the first test cable 50a is optically coupled to the first end 74 of the second temperature sensing cable 30b via a fourth connector 76. The second temperature sensing cable 30b is laid out on, alongside, or otherwise in close proximity to sections 80 and 82 of the pipeline 24 to be monitored for leakage. Pipe sections 80 and 82 may be two continuous sections of one pipe in the pipeline or may represent two pipe sections in two separate pipes.

The second temperature sensing cable 30b is disposed between the first test cable 50a and the second test cable 50b.

The second end 84 of the second temperature sensing cable 30b is optically coupled to the first end 86 of the second test cable 50b, via a fifth connector 88. The second test cable 50b runs between the second temperature sensing cable 30b and the third temperature sensing cable 30c. The second end 90 of the second test cable 50b is optically coupled to the first end 92 of the third temperature sensing cable 30c, via a sixth connector 94. The third temperature sensing cable 30c extends between the second test cable 50b and the DTS unit 28. The third temperature sensing cable 30c is optically coupled at a second end 96 thereof to the second connector 32b of the DTS unit 28.

The foregoing arrangement of temperature sensing cables 30a, 30b and 30c, and testing cables 50a and 50b is generally referred to as a loop configuration, with either end of the sensing line 26 being connected to the DTS unit 28. Thus arranged, the sensing line could be configured for either single-ended or double-ended interrogation.

In other embodiments, the temperature sensing cables and test cables could be laid out differently along a sensing line. For instance, in an alternative embodiment, the temperature sensing cable 30c could be omitted from the sensing line 26 and the sensing line 26 could be connected to the DTS unit 28 at one end only. In such applications, the sensing line would be configured for single-ended interrogation only. In yet other embodiments, the connectors could be replaced by fusion splices or mechanical splices.

As shown in FIG. 1, the first testing station 58a defined by the first test cable 50a and the first cooling device 52a is located at or near the head of the sensing loop or line 26. Similarly, the second testing station 58b defined by the second test cable 50b and the second cooling device 52b, is disposed at or near the end of the sensing loop or line 26. The first and second testing stations 58a and 58b are arranged in non-leak monitoring areas or zones located away from the pipe sections 80 and 82 being monitored, so as to avoid any confusion as to whether an actual leakage event or a simulated leakage event is occurring.

Having a testing station at either end of the sensing line 26 tends to allow for the assessment of integrity along the full line. Additionally, as explained in greater detail below, it may also allow for a higher frequency of testing yielding the accumulation of more data on the reliability of the DTS subsystem 20 deployed on pipeline 24 in a shorter period of time. Of course, additional (i.e. more than two) testing stations may be deployed along the sensing line. In such cases, additional testing cables, cooling devices and connectors will be required.

While it is generally preferred that there be at least two testing stations deployed along the sensing line 26, this need not be the case in every application. In certain applications, it may be desirable to have only one testing station. In such cases, only a single testing cable and a single cooling device may be required. The deployment of only a single testing station would likely require the DTS system to have fewer connectors and fewer temperature sensing cables. In such embodiments, where only a single testing station is provided, it is preferable to place the testing station at the end of the sensing line or sensing loop in order to verify the functionality of the entire sensing line.

The DTS unit 28 is connected for data communication (e.g. wired or wireless communication) with a relay device 104 which is designed to trigger an alarm condition if the DTS unit 28 detects a drop in temperature at a location along the sensing line 26. Depending on where along the sensing line 26 the drop in temperature occurs and is detected, the alarm condition signifies the occurrence of an actual leakage event or a simulated leakage event.

The relay device 104 could include multiple relays that could be assigned to different "zones" or sections of the sensing line 26. Preferably, one relay would be assigned to each of the testing stations 58a and 58b (i.e. non-leak monitoring zones) and another relay would be assigned to pipe sections 80 and 82 (i.e. leak monitoring zones). The DTS unit 28 would be configured to output a signal to the relay device 104 which would actuate the appropriate relay.

The relay device 104 is itself configured for communication (e.g. wired or wireless communication) with the controller 54 of the automated testing system 22 and a plant or facility controller 106 which controls the flow of fluid through the pipeline 24. If the DTS unit 28 senses a drop in temperature at either of the testing stations 58a and 58b, the relay device 104 is designed to trigger an alarm condition (signifying the occurrence of a simulated leakage event) and communicate such alarm condition to the controller 54. If the DTS unit 28 senses a drop in temperature along a pipe section being monitored, the relay device 104 is designed to trigger an alarm condition (signifying the occurrence of an actual leakage event) and communicate such alarm condition to the plant controller 106. The controller 54 is also configured for communication (e.g. wired or wireless communication) with the plant controller 106 to allow the plant controller 106 to receive a signal from the controller 54 indicative that a cooling sequence has been initiating.

Figure 3:
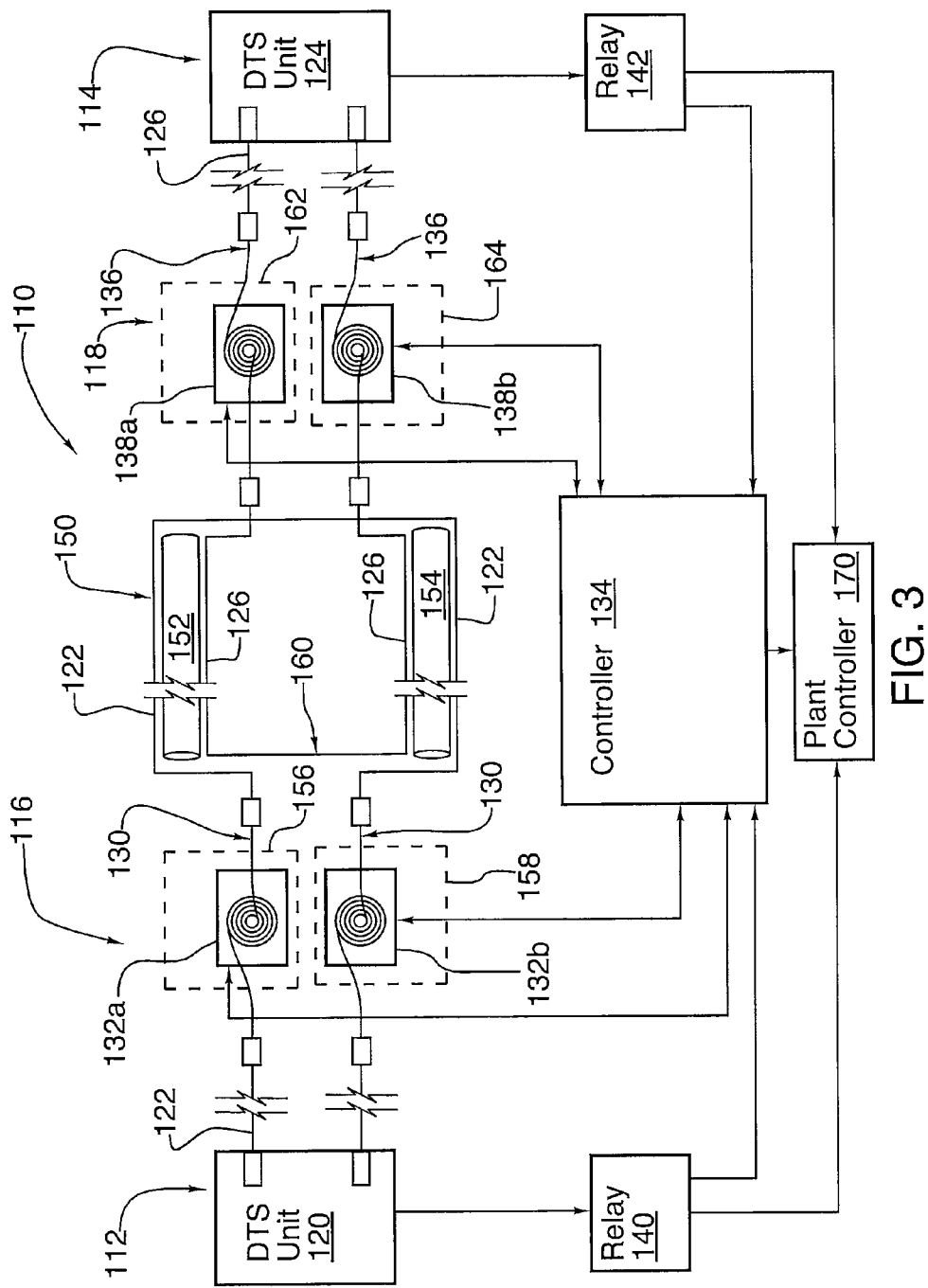
FIG. 3 illustrates an distributed temperature sensing system having an automated testing system connected to a distributed temperature sensing subsystem deployed on a gas-carrying pipeline to form two overlapping and redundant sensing lines, in accordance with another embodiment of the present invention.

Other configurations for the deployment of a DTS system and an automated testing system are possible. In the embodiment described above and shown in FIG. 1, the DTS subsystem 20 employs a single DTS unit 28 and the automated testing system 22 has two testing stations 58a and 58b; all of which are deployed along a single sensing line 26. This need not be the case in every application. For instance, for additional safety, it may desirable to create some redundancy with a second sensing line. An example of an embodiment having two overlapping sensing lines is shown in FIG. 3. In this embodiment, the DTS system designated generally with reference numeral 110 includes a first DTS subsystem 112, a second DTS subsystem 114, a first automated testing system 116 associated with the first DTS subsystem 112 and a second automated testing system 118 associated with the second DTS subsystem 114.

The first DTS subsystem 112 includes a DTS unit 120 and a plurality of temperature sensing cables (generically identified with reference numeral 122) optically coupled to the DTS unit 120. The second subsystem 114 includes a DTS unit 124 and a plurality of temperature sensing cables (generically identified with reference numeral 126) optically coupled to the DTS unit 124. The DTS units 120 and 124 are similar in all material respects to the DTS unit 28 described above. Similar the temperatures sensing cables 122 and 126 are similar in all material respects to the temperature sensing cables 30.

The first automated testing system designated generally with reference numeral 116 includes a plurality of test temperature sensing cables (generically identified with reference numeral 130), a pair of cooling devices 132a and 132b for cooling sections of the test cables 130 and a controller 134 for actuating the cooling devices 132a and 132b. The second automated testing system designated generally with reference numeral 118 also includes a plurality of test temperature sensing cables (generically identified with reference numeral 136), a pair of cooling devices 138a and 182b for cooling sections of the test cables 136. The controller 134 also forms part of the second automated testing system 118. It is configured to actuate the cooling devices 138a and 138b. In other embodiments it is conceivable that one controller could be provided for each pair of cooling devices.

The test cables 130 and 136 are similar in all material respects to the temperature sensing cables 30 described above. The cooling devices 132a, 132b, 138a and 138b are generally similar to the cooling devices 52a and 52b. The controller 134 is generally similar to the controller 54.

In this embodiment, a first sensing line 150 is defined by the temperature sensing cables 122 and the test cables 130. The DTS unit 120, the temperature sensing cables 122, the test cables 130, the cooling devices 132a and 132b and the controller 134 are all deployed along pipe sections 152 and 154 in a manner similar to the deployment of corresponding elements along the pipe sections 80 and 82 shown in FIG. 1. There are also two testing stations 156 and 158 (similar to testing stations 58a and 58b) provided along the first sensing line 150.

Similarly, a second sensing line 160 is defined by the temperature sensing cables 126 and the test cables 136. The DTS unit 124, the temperature sensing cables 126, the test cables 136, the cooling devices 138a and 138b and the controller 134 are all deployed along pipe sections 152 and 154 in a manner generally similar to the deployment of corresponding elements 120, 122, 130, 132a, 132b and 134, except that the former elements are laid out in a mirror image arrangement relative to the latter elements. In other embodiments, the elements 124, 126, 136, 138a, 138b and 134 could be oriented similar to the elements 120, 122, 130, 132a, 132b and 134. As is the case for the first sensing line 150, two testing stations 162 and 164 (similar to testing stations 58a and 58b) are provided along the second sensing line 160.

The DTS unit 120 is connected for data communication (e.g. wired or wireless communication) to a relay device 140. Similarly, the DTS unit 124 is connected for data communication (e.g. wired or wireless communication) to a relay device 142. The relay devices 140 and 142 are generally similar to the relay device 104 described above. In this embodiment, the relay device 140 is designed to trigger an alarm condition if the DTS unit 120 detects a drop in temperature at a location along the first sensing line 150. In like fashion, the relay device 142 is designed to trigger an alarm condition if the DTS unit 124 detects a drop in temperature at a location along the second sensing line 160. In each case, depending on where along the sensing line 150 or the sensing line 160 the drop in temperature occurs and is detected, the alarm condition signifies the occurrence of an actual leakage event or a simulated leakage event.

The relay devices 140 and 142 are configured for communication (e.g. wired or wireless communication) with the controller 134 and a plant controller 170.

If the DTS unit 120 senses a drop in temperature at either of the testing stations 156 and 158, it outputs a signal to one of the relays of the relay device 140 assigned to the non-leak monitoring zone. The relay device 140 triggers an alarm condition (signifying the occurrence of a simulated leakage event). If the DTS unit 120 senses a drop in temperature along the pipe section 152, 154 being monitored on the first sensing line 150, it outputs a signal to one of the relays of the relay device 140 assigned to the leak monitoring zone. The relay device 140 triggers an alarm condition (signifying the occurrence of an actual leakage event) and communicates such alarm condition to the plant controller 170.

Similarly, if the DTS unit 124 senses a drop in temperature at either of the testing stations 162 and 164, it outputs a signal to one of the relays of the relay device 142 assigned to the non-leak monitoring zone. The relay device 142 triggers an alarm condition (signifying the occurrence of a simulated leakage event). If the DTS unit 124 senses a drop in temperature along the pipe section 152, 154 being monitored on the second sensing line 160, it outputs a signal to one of the relays of the relay device 142 assigned to the leak monitoring zone. The relay device 142 triggers an alarm condition (signifying the occurrence of an actual leakage event) and communicates such alarm condition to the plant controller 170.

The controller 134 is also configured for communication (e.g. wired or wireless communication) with the plant controller 170 to allow the plant controller 170 to receive a signal from the controller 134 indicative that a cooling sequence has been initiating.

While the embodiment illustrated in FIG. 3 is configured with two overlapping sensing lines, it will be appreciated that in certain applications additional (i.e. more than two) sensing lines could be deployed for increased system redundancy. In such cases, a 2oo3 voting system could be implemented.

Figure 2:
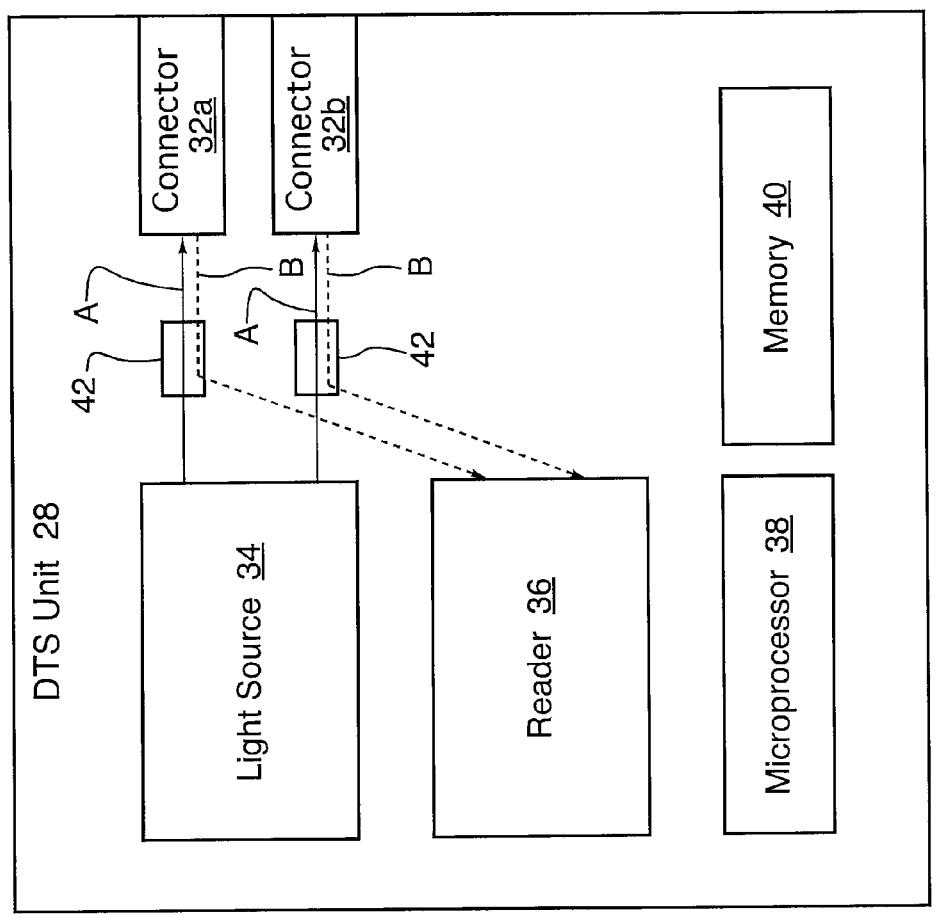
FIG. 2 is a block diagram showing components of the DTS unit of the distributed temperature sensing subsystem illustrated in FIG. 1.
Figure 4A:
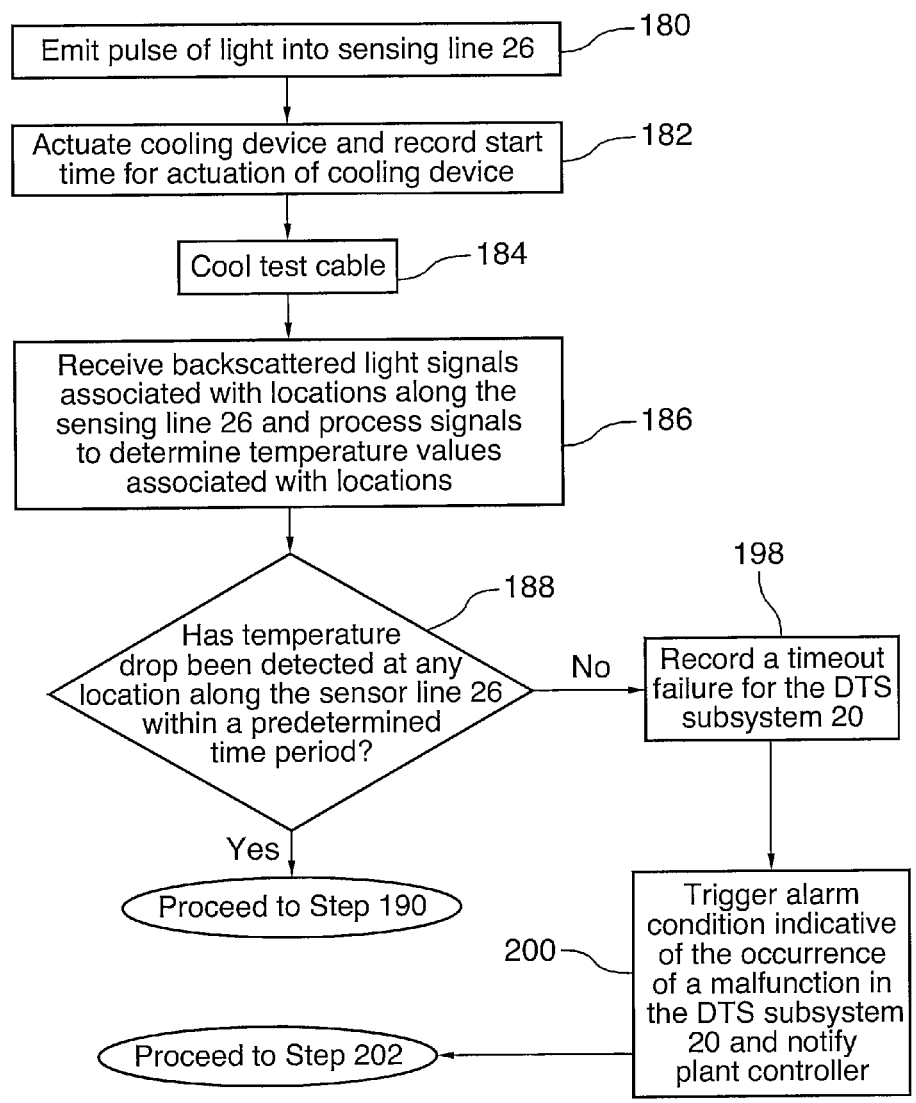
FIGS. 4A and 4B together form a flowchart illustrating the steps to be performed for a distributed temperature sensing process incorporating an automated testing process in connection with the DTS system shown in FIG. 1.
Figure 4B:
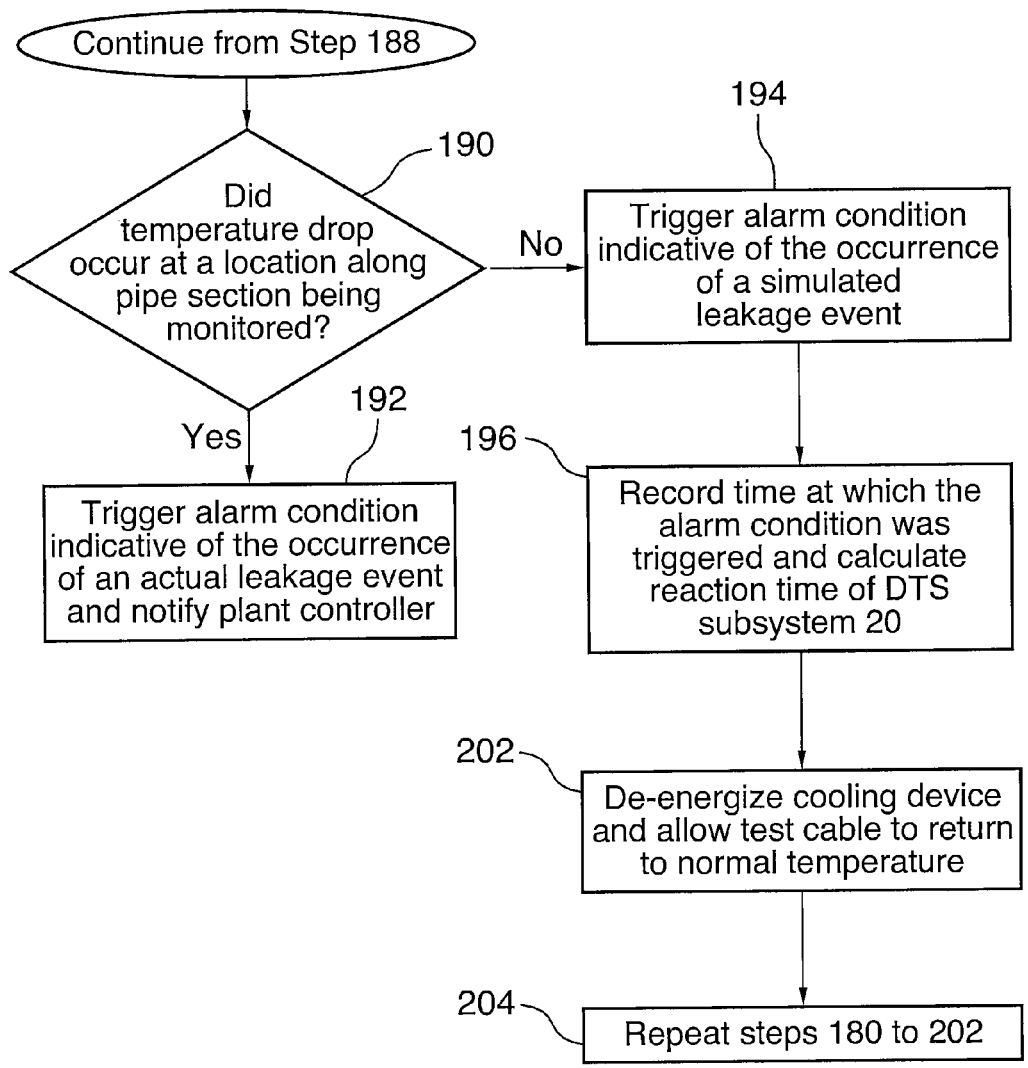

With reference to FIGS. 4A and 4B, an exemplary method for testing the efficacy and reliability of the DTS subsystem 20 deployed along the pipeline 24 in accordance with an embodiment of the present invention, is now described. At step 180, the DTS unit 28 is actuated and the light source 34 periodically emits pulses of light into the sensing line 26 (depicted with solid line arrows A in FIG. 2). At step 182, at a predetermined time interval (or, in some embodiments, at a random time interval), the controller 54 actuates the cooling device 52a (or the cooling device 52b, as the case may be) and records the start time for the actuation of the cooling device storing this data in memory 62. Alternatively, if the controller 54 is provided with a timer, the timer is initiated. At step 184, the actuation of the cooling device 52a (or the cooling device 52b) causes the temperature of the test cable 50a (or the test cable 50b) to drop. The temperature drop in the test cable mimics the temperature effect which would otherwise be produced by exposure to the gas leaking from the pipeline 24. If the first testing station 58a (or the second testing station 58b) is provided with a temperature sensor, the actual temperature of the test cable 50a (or test cable 50b) may be recorded and stored in memory 62, as well.

At step 186, the receiver 36 receives backscattered light signals (depicted with dashed line arrows B in FIG. 2) associated with locations along the sensing line 26 and the microprocessor 38 processes these signals to determine the temperature values associated with such locations. In this embodiment, the sensing locations are determined using ODTR techniques (Optical Time Domain Reflectometry). In alternative embodiments, other suitable techniques may be employed, for example, Optical Frequency Domain Reflectrometry (OFDR) techniques. Additionally, while in this embodiment, Raman backscattered light signals are used to determine temperature at any location along the sensing line 26, in other embodiments, other light scatterings could be used for temperature measurement along the sensing line, for instance, Brillouin scattering or Rayleigh scattering.

At step 188, the DTS unit 28 monitors whether there has been a temperature drop at any location along the sensing line 26. If the DTS unit 28 detects a temperature drop at a location along the sensing line 26, the DTS unit 28 determines whether the temperature drop occurred at a location along the pipe sections 80 and 82 being monitored by the DTS system or whether it occurred at a location corresponding to the first testing station 58*a* (or the second testing station 58*b*), at step 190. If the DTS unit 28 determines that the temperature drop occurred at a location along the pipe sections 80 and 82, an actual leakage event has occurred and the DTS unit 28 outputs a signal to one of the relays of the relay device 104 assigned to the leak monitoring zone. An alarm condition is triggered by relay device 104 and is communicated to the plant controller 106, at step 192. Once notified of the actual leakage event, the plant controller 106 may initiate such remedial action(s) as required.

If, at step 190, the DTS unit 28 detects that the temperature drop occurred at a location along the sensing line 26 corresponding to the first testing station 58*a* (or the second testing station 58*b*), a simulated leakage event has occurred and the DTS unit 28 outputs a signal to one of the relays of the relay device 104 assigned to the non-leak monitoring zone. The alarm condition is triggered by relay device 104 and is communicated to the controller 54, at step 194. At step 196, the controller 54 records the time at which the alarm condition was triggered and calculates the reaction time of the DTS subsystem 20. This data is then stored in memory 62. Alternatively, if the controller 54 is provided with a timer, the timer is stopped and the reaction time of the DTS subsystem 20 is recorded and stored in memory 62.

If, at step 188, the DTS unit 28 fails to detect the temperature drop occurring at a location along the sensing line 26 corresponding to the first testing station 58*a* (or the second testing station 58*b*) within a predetermined time period, the controller 54 records a timeout failure for the DTS subsystem 20 and stores this data in memory 62, at step 198. The timeout failure is indicative of a malfunction in the DTS subsystem 20. In this embodiment, the time period is set at 120 seconds. In other embodiments, a different time period could be selected.

At step 200, the controller 54 triggers an alarm condition indicative of the occurrence of a malfunction in the DTS subsystem 20 and notifies the plant controller 106 of same. Once notified, the plant controller 106 may initiate such remedial action(s) as required.

After either step 196 or step 200, the controller 54 de-energizes the cooling device 52*a* (or the cooling device 52*b*) and the temperature of the test cable 50*a* (or test cable 50*b*) is permitted to return to its original (normal) temperature, at step 202. Thereafter, steps 180 to 202 may be repeated after the passage of a predetermined (or random) time interval, at step 204.

In certain embodiments, the performance of steps 180 to 202 entailing the actuation of the first cooling device 52*a* and the cooling of the first test cable 50*a* could be alternated with the performance of steps 180 to 202 entailing the actuation of the second cooling device 52*b* and the cooling of the first test cable 50*b*. For instance, in one embodiment, the controller 54 could be configured to actuate the first cooling device 52*a* every even hour, and the second cooling device 52*b* every odd hour. In such an embodiment, at the even hours, the performance of steps 180 to 202 would include the actuation of the first cooling device 52*a* and the cooling of the first test cable 50*a*, while at the odd hours the performance of steps 180 to 202 would include the actuation of the second cooling device 52*b* and the cooling of the first test cable 50*b*.

In other embodiments, the automated testing method could include additional steps or could omit certain steps. In still other embodiments, the sequence or order of the steps performed in the method could be altered.

With appropriate modifications, the exemplary method described above could be implemented with the DTS system 110 shown in FIG. 3.

The data recorded by the controller 54 and stored in memory 62 can be analyzed statistically to identify a maximum response time or an average response time for the DTS subsystem 20 with the standard deviation associated with same. Moreover, the data could be analyzed to provide an estimate of probability of failure on demand (PFD), by counting the number of times the DTS subsystem 20 has succeeded or failed to generate an alarm signal when then the cooling sequence was initiated. The results of such analyses could be displayed in real time on a user interface. Such user interface could be associated with the controller 54, the DTS unit 28 (e.g. a monitor) or a handheld PDA. The results could also be made available on a website and be used to generate periodic reports on the efficacy and reliability of the DTS subsystem 20.

As will be appreciated from the foregoing description, an automated testing system in accordance with the principles of the present invention can be relatively easily incorporated into a new or existing DTS system deployed in the field. The automated testing system is operable to monitor the reliability of the DTS system continuously and autonomously without interrupting or interfering with the operation of the DTS system. Advantageously, the automated testing system can be used to collect a potentially large amount of data in a relatively short period of time, all with minimal human intervention, thereby allowing for a significant operating history for the DTS system to be generated.

In the embodiments shown in FIGS. 1 and 3, the automated testing systems 22, 116 and 118 are specifically configured to simulate a leakage event in the pipeline being monitored by mimicking the cooling temperature effect which would otherwise result from gas leaking from the pipeline. In particular, those automated testing systems include cooling devices for cooling the test cables. It will be appreciated that with appropriate modifications, the principles of the present invention could be applied to similar advantage to monitoring the efficacy and reliability of distributed temperature sensing systems deployed on pipelines carrying liquids. In such applications, the automated testing systems would be adapted to simulate a leakage event in the pipeline being monitored by mimicking the heating temperature effect which would otherwise result from exposure to liquid leaking from the pipeline. The configuration and arrangement of the DTS systems shown in FIGS. 1 and 3 (or other similar configurations and arrangements) could be used in such applications, except that the cooling devices included in the automated testing systems would have to be replaced with heating devices.

Figure 5:
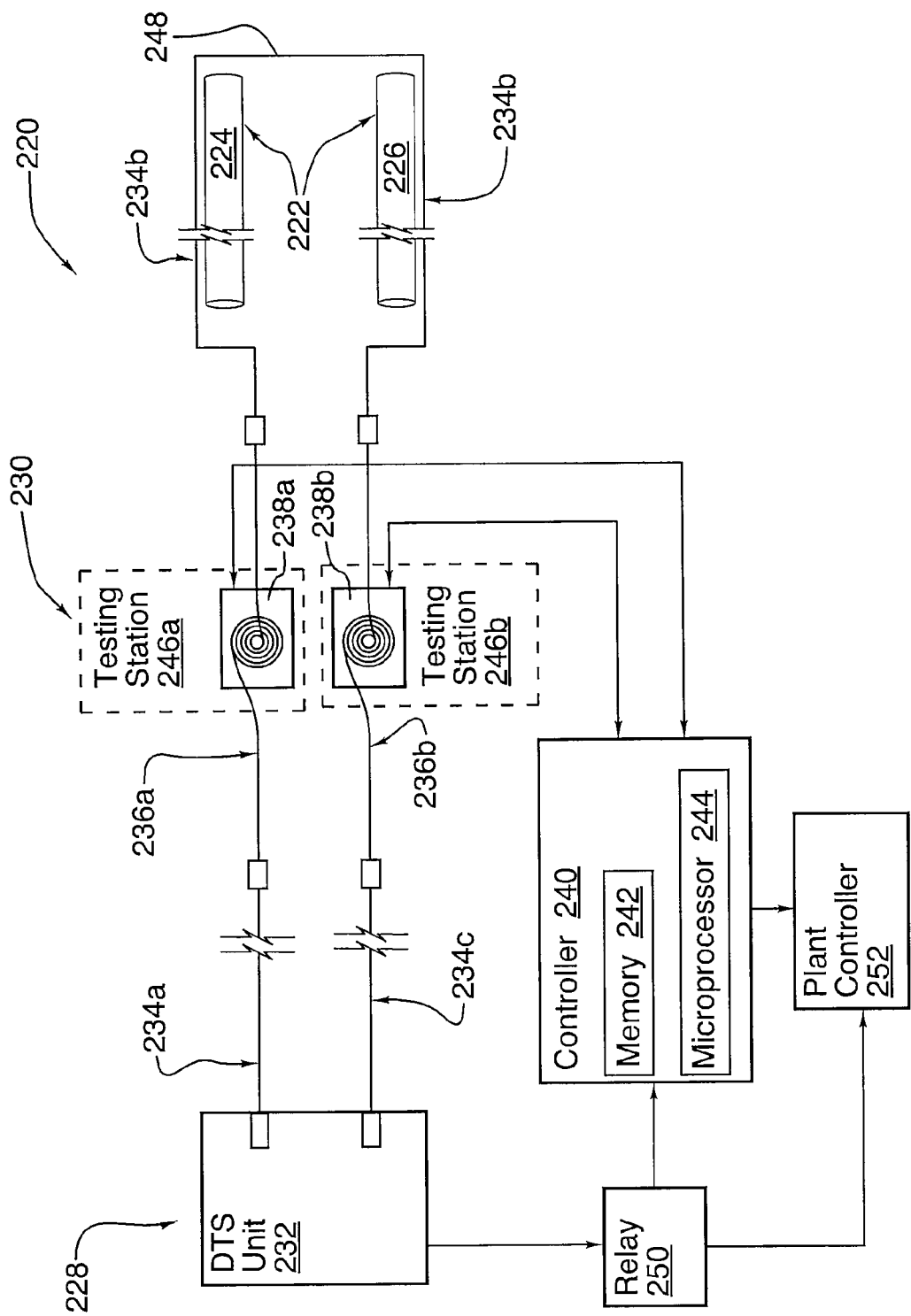
FIG. 5 illustrates an distributed temperature sensing system having an automated testing system connected to a distributed temperature sensing subsystem deployed on a liquid-carrying pipeline to form a single sensing line, in accordance with an embodiment of the present invention.

FIG. 5 shows an exemplary DTS system designated generally with reference numeral 220 for deployment on a liquid-carrying pipeline 222, and in particular pipe sections 224 and 226. The DTS system 220 is similar to the DTS system 10 in that it too includes a DTS subsystem 228 and an automated testing system 230. The DTS subsystem 228 is similar in all material aspects to the DTS subsystem 20. It has a DTS unit 232 and a plurality of temperature sensing cables 234*a*, 234*b* and 234*c*; these elements are similar to their counterpart elements in DTS subsystem 20.

The automated test system 230 includes a plurality of test temperature sensing cables 236*a* and 236*b* (similar to test cables 50*a* and 50*b*), a pair of first and second heating devices 238*a* and 238*b* for heating sections of the test cables 236*a* and 236*b*, and a controller 240 (generally similar to controller 54) for actuating the heating devices 238a and 238b. The controller 240 includes memory 242 and a microprocessor 244.

Preferably, the heating devices 238a and 238b are thermoelectric heating devices (also known as Peltier heaters) and operable to heat test cables to have temperature profiles similar to that which would be produced if the test cables were exposed to a liquid leak. In alternative embodiments, the heating devices could take the form of gas or liquid-based heating devices, burners, or electrical resistance heaters.

The first heating device 238a and the first test cable 236a cooperatively define a first testing station 246a. Similarly, the second heating device 238b and the second test cable 236b cooperatively define a second testing station 246b. In this embodiment, a sensing line 248 is defined by the first temperature sensing cable 234a, the first test cable 236a, the second temperature sensing cable 234b, the second test cable 238b and the third temperature sensing cable 234c; all optically coupled to each other using connectors. The layout of sensing line 248 is generally similar to that of the sensing line 26.

The DTS unit 232 is connected for data communication (e.g. wired or wireless communication) with a relay device 250 which is designed to trigger an alarm condition if the DTS unit 232 detects a rise in temperature at a location along the sensing line 248. Depending on where along the sensing line 248 the rise in temperature occurs and is detected, the alarm condition signifies the occurrence of an actual leakage event or a simulated leakage event.

The relay device 250 is itself configured for communication (e.g. wired or wireless communication) with the controller 240 of the automated testing system 220 and a plant or facility controller 252 which controls the flow of fluid through the pipeline 222. If the DTS unit 232 senses a rise in temperature at either of the testing stations 246a and 246b, the relay device 250 is designed to trigger an alarm condition (signifying the occurrence of a simulated leakage event) and notify the controller 240 of such alarm condition. If the DTS unit 232 senses a rise in temperature along a pipe section being monitored, the relay device 250 is designed to trigger an alarm condition (signifying the occurrence of an actual leakage event) and notify the plant controller 252 of such alarm condition. The controller 240 is also configured for communication (e.g. wired or wireless communication) with the plant controller 252.

It should be appreciated that a DTS system similar to that shown in FIG. 3 could also be configured for a liquid-carrying pipeline. Moreover, while the exemplary deployment depicted in FIG. 5 is made on a liquid-carrying pipeline, it should be appreciated that the DTS system described is not limited to deployment solely on liquid-carrying pipelines. The DTS system shown in FIG. 5 could be deployed on any structure for the purposes of detecting leaks or infiltration of liquids, for example, dams, levees, reservoirs, pools, storage tanks, basins, ship hulls, tunnels and mine shafts. The system could also be used for fire detection in tunnels, buildings and other similar applications. Moreover, the system could also be employed to detect hot-spots in power cables (e.g. submarine power cables or underground power cables).

Figure 6A:
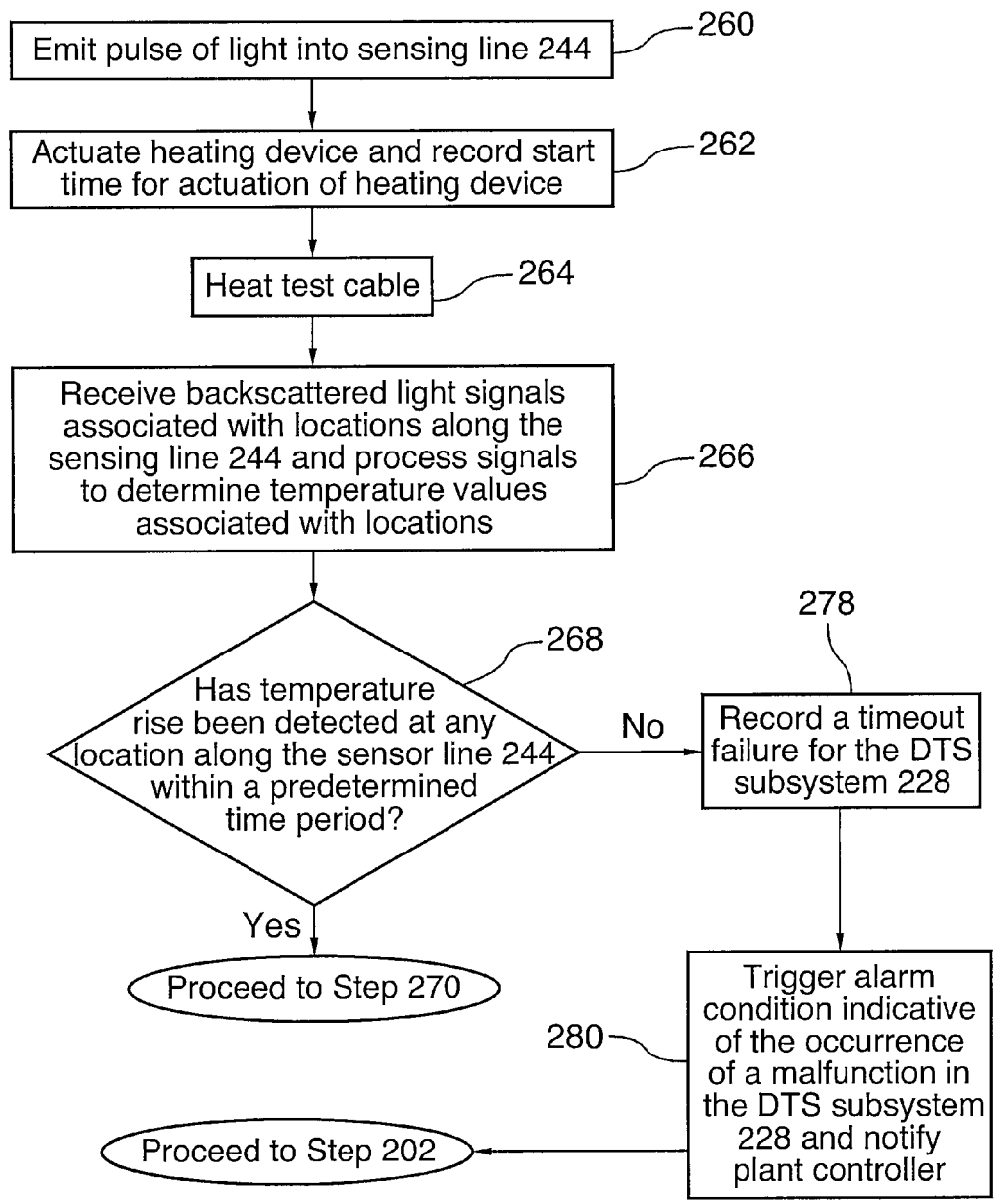
FIGS. 6A and 6B together form a flowchart illustrating the steps to be performed for a distributed temperature sensing process incorporating an automated testing process in connection with the DTS system shown in FIG. 5.
Figure 6B:
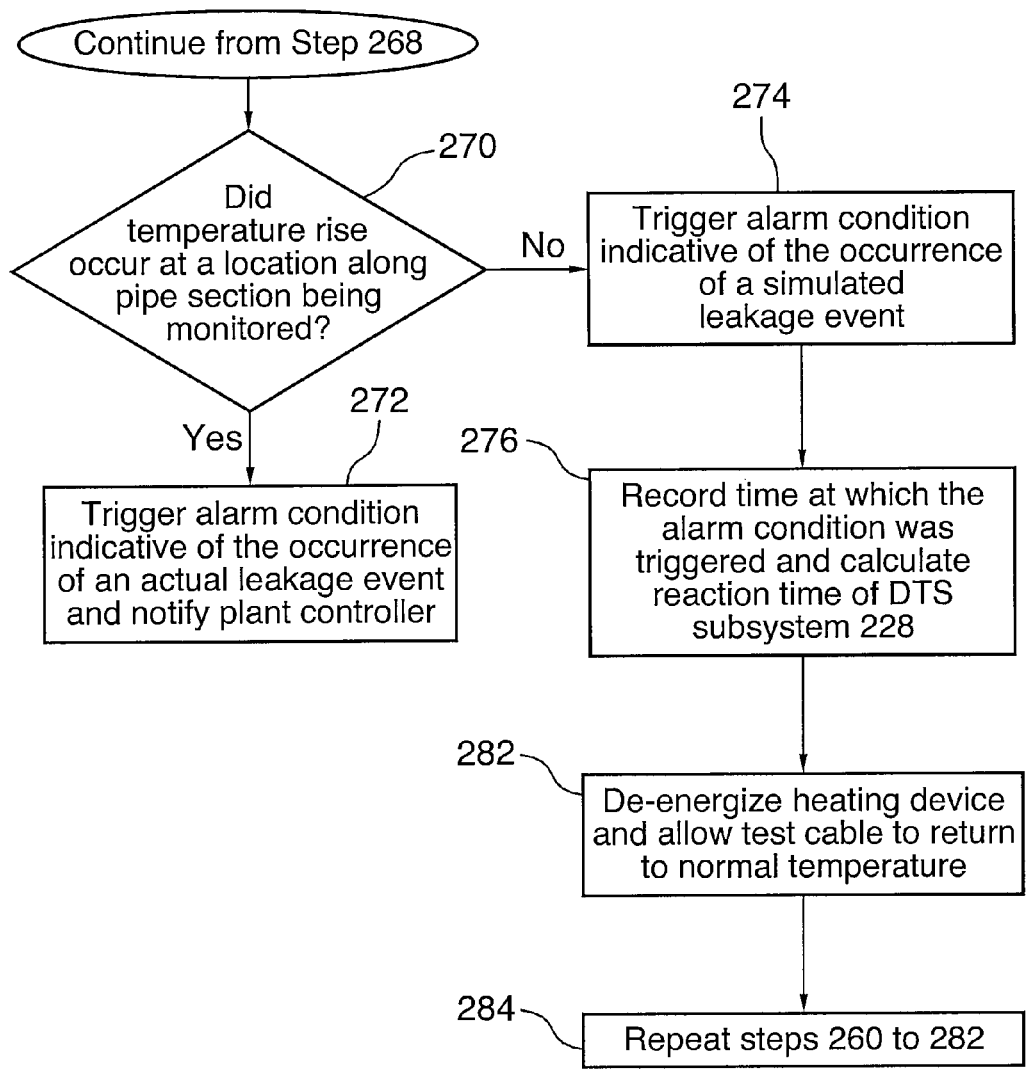

The method for testing the efficacy and reliability of the DTS system 220 deployed along the liquid-carrying pipeline 222 is generally similar to the method described above with reference to FIGS. 4A and 4B in respect of gas-carrying pipeline 24, except, inter alia, the test cables are heated (instead of cooled) and the automated testing system 230 is configured to detect whether there has been a rise in temperature (instead of a drop in temperature) at any location along the sensing line 248. A detailed description of an exemplary method for use in connection with the DTS system 220 now follows with reference to FIGS. 6A and 6B.

At step 260, the DTS unit 232 is actuated and the light source of the DTS unit 232 periodically emits pulses of light into the sensing line 248. At step 262, at a predetermined time interval (or, in some embodiments, at a random time interval), the controller 240 actuates the heating device 238a (or the heating device 238b, as the case may be) and records the start time for the actuation of the heating device storing this data in memory 242 of the controller 240. Alternatively, if the controller 240 is provided with a timer, the timer is initiated. At step 264, the actuation of heating device 238a (or the heating device 238b) causes the temperature of the test cable 236a (or the test cable 236b) to rise. The rise in temperature in the test cable mimics the heating temperature effect which would otherwise be produced by exposure to liquid leaking from the pipeline 222. If the first testing station 246a (or the second testing station 246b) is provided with a temperature sensor, the actual temperature of the test cable 236a (or test cable 236b) may be recorded and stored in the memory of the controller 240, as well.

At step 266, the receiver of the DTS unit 232 receives backscattered light signals associated with locations along the sensing line 248 and the microprocessor of the DTS unit processes these signals to determine the temperature values associated with such locations. In this embodiment, the sensing locations are determined using ODTR techniques (Optical Time Domain Reflectometry). In alternative embodiments, other suitable techniques may be employed. In alternative embodiments, other suitable techniques may be employed, for example, Optical Frequency Domain Reflectrometry (OFDR) techniques. Additionally, while in this embodiment, Raman backscattered light signals are used to determine temperature at any location along the sensing line 26, in other embodiments, other light scatterings could be used for temperature measurement along the sensing line, for instance, Brillouin scattering or Rayleigh scattering.

At step 268, the DTS unit 232 monitors whether there has been a rise in temperature at any location along the sensing line 248. If the DTS unit 232 detects a rise in temperature at a location along the sensing line 248, the DTS unit 232 determines whether the rise in temperature occurred at a location along the pipe sections 224 and 226 being monitored by the DTS system or whether it occurred at a location corresponding to the first testing station 246a (or the second testing station 246b), at step 270. If the DTS unit 232 determines that the rise in temperature occurred at a location along the pipe sections 224 and 226, an actual leakage event has occurred and the DTS unit 232 outputs a signal to one of the relays of the relay device 250 assigned to the leak monitoring zone. The alarm condition is triggered by relay device 250 and is the plant controller 252 is notified, at step 272. Once notified of the actual leakage event, the plant controller 252 may initiate such remedial action(s) as required.

If, at step 270, the DTS unit 232 detects that the rise in temperature occurred at a location along the sensing line 248 corresponding to the first testing station 246a (or the second testing station 246b), a simulated leakage event has occurred and the DTS unit 232 outputs a signal to one of the relays of the relay device 250 assigned to the non-leak monitoring zone. The alarm condition is triggered by relay device 250 and the controller 240 is notified, at step 274. At step 276, the controller 240 records the time at which the alarm condition was triggered and calculates the reaction time of the DTS subsystem 20. This data is then stored in the memory 242 of the controller 240. Alternatively, if the controller 240 is provided with a timer, the timer is stopped and the reaction time of the DTS subsystem 228 is recorded and stored in the memory of the controller.

If, at step 268, the DTS unit 232 fails to detect the rise in temperature occurring at a location along the sensing line 244 corresponding to the first testing station 242a (or the second testing station 242b) within a predetermined time period, the controller 240 records a timeout failure for the DTS subsystem 228 and stores this data in the memory of the controller 240, at step 278. The timeout failure is indicative of a malfunction in the DTS subsystem 228. In this embodiment, the time period is set at 120 seconds. In other embodiments, a different time period could be selected.

At step 280, the controller 240 triggers an alarm condition indicative of the occurrence of a malfunction in the DTS subsystem 228 and notifies the plant controller 252 of same. Once notified, the plant controller 252 may initiate such remedial action(s) as required.

After either step 276 or step 280, the controller 240 de-energizes the heating device 238a (or the heating device 238b) and the temperature of the test cable 236a (or test cable 236b) is permitted to return to its original (normal) temperature, at step 282. Thereafter, steps 260 to 282 may be repeated after the passage of a predetermined (or random) time interval, at step 284.

In certain embodiments, the performance of steps 260 to 282 entailing the actuation of the heating device 238a and the heating of the first test cable 236a could be alternated with the performance of steps 260 to 282 entailing the actuation of the heating device 238b and the heating of the second test cable 236b.

In other embodiments, the automated testing method could include additional steps or could omit certain steps. In still other embodiments, the sequence or order of the steps performed in the method could be altered.

In the embodiments described above, the principles of the present invention were put into application to test the efficacy of a distributed temperature sensing system. In other embodiments, with appropriate modifications, the principles of the present invention could be put to good advantage to test the efficacy of distributed temperature and strain sensing (DTSS) systems based on Brillouin scattering, Rayleigh scattering or still other similar sensing parameters, relying on the fact that in such DTSS systems, strain and temperature variations produce equivalent changes in the backscattered light signal. Two examples of such embodiments are described below.

In certain embodiments, it may be possible to adapt the automated system described above to test the DTSS system's reliability in detecting changes in temperature, by exposing test cables laid out along a sensing line to tensional or compression strain. Because a change in strain produces a backscattered light signal equivalent to that of a change of temperature, the backscattered light signal associated with the change of strain can be processed to obtain a temperature reading corresponding to that backscattered light signal. This temperature reading would correspond to the hotter or cooler temperature reading recorded by the DTSS system along a section of temperature sensing cable exposed to liquid or gas leaking from the pipeline being monitored. A setup similar to that shown in FIGS. 1 and 5 could be employed to put the foregoing embodiment into effect, except that the cooling devices or heating devices of the automated testing system would replaced with devices capable of inducing tensional or compression strain on the test cable(s).

The method for operating such an automated testing system would include steps generally similar to steps 180 to 202 set out in FIGS. 4A and 4B, except for the modifications set out below. In the method step corresponding to step 182, the controller would actuate one or the other of the strain-inducing devices and would record the start time for actuation of the strain-inducing device. In the method step corresponding to step 184, one or other of the test cables would be exposed to a change in tensional or compression strain. In the method step corresponding to step 186, the backscattered light signal associated with the test cable exposed to a change in strain would be processed to obtain a corresponding temperature reading. Thereafter, steps corresponding to steps 188 to 204 would be carried out, except that in the step corresponding to step 202, the strain-inducing device would be de-energized and the test cable would be permitted revert to its original state.

In other embodiments, it may be possible to adapt the automated system described above to test the DTSS system's reliability in detecting changes in strain, by heating or cooling the test cables laid out along a sensing line. Because the change of temperature produces a backscattered light signal equivalent to that a change of strain, the backscattered light signal generated by a change of temperature can be processed to obtain a strain reading corresponding to that backscattered light signal. This strain reading would correspond to a tensional or compression strain reading recorded by the DTSS system along a section of sensing line exposed to strain. A setup similar to that shown in FIGS. 1 and 5 could be employed to put the foregoing embodiment into effect.

The method for operating such an automated testing system would include steps generally similar to steps 180 to 202 set out in FIGS. 4A and 4B, except for the modifications set out below. In the method step corresponding to step 186, the backscattered light signal associated with the cooled test cable would be processed to obtain a corresponding strain reading. In the method step corresponding to step 188, the controller would monitor whether any change of strain has been detected at any location along the sensor line within a predetermined time period. In the method step corresponding to step 190, the DTS unit would determine whether the change of strain occurred at a location along the pipe sections being monitored by the DTS system or whether it occurred at a location corresponding to one or the other of the testing stations. Thereafter, steps corresponding to steps 192 to 204 would be carried out.

Of course, it may be possible to use the automated system described above to test the DTSS system's reliability in detecting changes in strain, by exposing the test cables laid out along a sensing line to changes in strain. In such cases, a setup similar to that shown in FIGS. 1 and 5 could be employed to put the foregoing embodiment into effect, except that the cooling devices or heating devices of the automated testing system would replaced with devices capable of inducing tensional or compression strain on the test cable(s). In the method step corresponding to step 188, the controller would monitor whether any change of strain has been detected at any location along the sensor line within a predetermined time period. In the method step corresponding to step 190, the DTS unit would determine whether the change of strain occurred at a location along the pipe sections being monitored by the DTS system or whether it occurred at a location corresponding to one or the other of the testing stations. Thereafter, steps corresponding to steps 192 to 204 would be carried out, except that in the step corresponding to step 202, the strain-inducing device would be de-energized and the test cable would be permitted revert to its original state.

It will thus be appreciated that the principles of the present invention can be used to test the efficacy of a distributed sensing system capable of detecting changes in temperature or strain along a sensing line.

Although the foregoing description and accompanying drawings relate to specific preferred embodiments of the present invention as presently contemplated by the inventor, it will be understood that various changes, modifications and adaptations, may be made without departing from the spirit of the invention.

What is claimed is:

1. A distributed sensing system comprising:
   at least one fibre optic sensing cable laid out on or along a structure to be monitored;
   a distributed sensing unit for sensing along a sensing line at least one physical parameter associated with the sensing line at a location thereof; the at least one physical parameter being selected from the group consisting of: (a) temperature; (b) strain; and (c) temperature and strain; the distributed sensing system being optically coupled to the at least one sensing cable;
   at least one fibre optic test cable optically coupled to the at least one sensing cable to form the sensing line;
   at least one device arranged relative to the at least one test cable to induce a first change in the at least one physical parameter associated with the at least one test cable; the first change being detectable by the distributed sensing unit;
   a controller configured for autonomously and periodically actuating the at least one change-inducing device to thereby test the efficacy and reliability of the distributed sensing unit; and
   a relay configured for communication with the distributed sensing unit and the controller;
   the relay being operable:
   (i) to trigger a first testing-event alarm condition in response to a signal received from the distributed sensing unit indicative of an occurrence of a simulated sensing event if the first change is detected; and
   (ii) to trigger a sensing-event alarm condition in response to a signal received from the distributed sensing unit indicative of an occurrence of a sensing event at a location along the structure being monitored if a second change is detected by the distributed sensing unit; the second change including a change in the at least one physical parameter associated with the at least one sensing cable,
   wherein the controller is operable to monitor a response of the distributed sensing unit to the change in the at least one physical parameter associated with the at least one test cable and to trigger a second testing-event alarm condition indicative of an occurrence of a malfunction in the distributed sensing system if no change has been detected within a predetermined time period.

2. The distributed sensing system of claim 1 wherein the at least one physical parameter includes temperature.

3. The distributed sensing system of claim 2 wherein the at least one change-inducing device is selected from the group consisting of: (a) a cooling device; (b) a heating device; and (c) a strain-inducing devices.

4. The distributed sensing system of claim 2 wherein the at least one change-inducing device is a temperature change-inducing device.

5. The distributed sensing system of claim 4 wherein the at least one temperature change-inducing device is selected from the group consisting of: (a) a cooling device; and (b) a heating device.

6. The distributed sensing system of claim 4 wherein the at least one temperature change-inducing device is a cooling device selected from the group consisting of: (a) a Peltier cooler; (b) a gas-based cooling device; and (c) a liquid-based cooling device.

7. The distributed sensing system of claim 4 wherein the at least one temperature change-inducing device is a heating device selected from the group consisting of: (a) a Peltier heater; (b) a gas-based heating device; (c) a liquid-based heating device; (d) a burner; and (e) an electrical resistance heater.

8. The distributed sensing system of claim 4 wherein the at least one temperature change-inducing device is disposed in heat exchange relation with the at least one test cable.

9. The distributed sensing system of claim 8 wherein the at least one test cable cooperates with the at least one cable temperature change-inducing device to define at least one testing station; the at least one testing station being disposed along the sensing line at a location away from the structure to be monitored.

10. The distributed sensing system of claim 9 wherein:
    the at least one test cable includes first and second test cables;
    the at least one temperature change-inducing device includes first and second temperature change-inducing devices;
    the first temperature change-inducing device being disposed in heat exchange relation with the first test cable;
    the second temperature change-inducing device being disposed in heat exchange relation with the second test cable;
    the at least one testing station includes first and second testing stations; the first testing station being defined by the first test cable in cooperation with the first temperature change-inducing device; the second testing station being defined by the second test cable in cooperation with the second temperature change-inducing device;
    the first and second testing stations being disposed along the sensing line at different locations.

11. The distributed sensing system of claim 9 wherein:
    the at least one temperature change-inducing device is a single temperature change-inducing device;
    the at least one test cable includes a first test cable and a second test cable; and
    the at least one testing station includes first and second testing stations; the first testing station being defined by the first test cable in cooperation with the single temperature change-inducing device; the second testing station being defined by the second test cable in cooperation with the single temperature change-inducing device.

12. The distributed sensing system of claim 1 wherein a length of the at least one test cable is supported on a spool.

13. The distributed sensing system of claim 12 wherein the length of the at least one test cable supported on the spool measures between 0.5 m and 2.0 m.

14. The distributed sensing system of claim 12 wherein the length of the at least one test cable supported on the spool is matched to the spatial resolution of the distributed sensing unit.

15. The distributed sensing system of claim 1 wherein the sensing line has a loop configuration.

16. The distributed sensing system of claim 15 wherein:
the at least one sensing cable includes first, second and third sensing cables; and
the at least one test cable includes first and second test cables; and
the first sensing cable being disposed between the distributed sensing unit and the first test cable; the second sensing cable being disposed between the first test cable and the second test cable; the third sensing cable being disposed between the second test cable and the distributed sensing unit.

17. The distributed sensing system of claim 16 wherein the sensing line is configured for one of single-ended interrogation and double-ended interrogation.

18. The distributed sensing system of claim 1 wherein the sensing line has a first end and a second end; and only the first end of the sensing line is connected to the distributed sensing unit.

19. The distributed sensing system of claim 1 wherein:
the distributed sensing unit is operable to:
(a) emit pulses of light for transmission through the sensing line;
(b) receive light signals from the sensing line; and
(c) derive from the light signals received the at least one physical parameter associated with the sensing line at a location thereof; and
the light signals received are light signals selected from the group consisting of: (a) Raman scattered light signals; (b) Brillouin scattered light signals; and (c) Rayleigh scattered light signals.

20. The distributed sensing system of claim 1 wherein the controller includes a timer to measure the time elapsed between the occurrence of the change in the at least one physical parameter associated with the at least one test cable and the detection thereof by the distributed sensing unit.

21. The distributed sensing system of claim 1 wherein:
the at least one physical parameter is temperature; and
the distributed sensing system further includes at least one temperature sensor for measuring the temperature of the at least one test cable; the temperature sensor being configured for communication with the controller.

22. The distributed sensing system of claim 1 wherein:
the at least one test cable includes first and second test cables;
the at least one change-inducing device includes first and second cooling devices; and
the controller is operable to actuate the first cooling device to cool the first test cable to a first predetermined temperature range and the second cooling device to cool the second test cable to a second predetermined temperature range.

23. The distributed sensing system of claim 22 wherein the first predetermined temperature range is the same as the second predetermined temperature range.

24. The distributed sensing system of claim 23 wherein the first predetermined temperature range is different than the second predetermined temperature range.

25. The distributed sensing system of claim 1 wherein:
the at least one test cable includes first and second test cables;
the at least one change-inducing device includes first and second temperature change-inducing devices; and
the controller is operable to actuate the first and second temperature change-inducing devices at random time intervals.

26. The distributed sensing system of claim 1 wherein:
the at least one test cable includes first and second test cables;
the at least one change-inducing device includes first and second temperature change-inducing devices; and
the controller is operable to actuate the first and second temperature change-inducing devices contemporaneously.

27. The distributed sensing system of claim 1 wherein:
the at least one test cable includes first and second test cables;
the at least one change-inducing device includes first and second temperature change-inducing devices; and
the controller is operable to actuate the first temperature change-inducing device at a first time interval and the second temperature change-inducing device at a second time interval.

28. The distributed sensing system of claim 27 wherein the first time interval and the second time interval are the same.

29. The distributed sensing system of claim 27 wherein the first time interval and the second time interval are staggered from each other.

30. An automated method for testing the reliability and the efficacy of a distributed sensing system deployed on a structure to be monitored, the method comprising the steps of:
(a) emitting from a distributed sensing unit pulses of light through a sensing line formed by at least one fibre optic sensing cable laid out on or along a structure to be monitored and at least one fibre optic test cable optically coupled to the at least one sensing cable;
(b) actuating at least one device arranged relative to the at least one test cable so as to induce a change in the at least one physical parameter associated with the at least one test cable; the at least one physical parameter associated with the at least one test cable being selected from the group consisting of: (i) temperature; (ii) strain; and (iii) temperature and strain;
(c) receiving, at the distributed sensing unit, backscattered light signals associated with locations along the sensing line;
(d) deriving from the light signals received the at least one physical parameter associated with locations along the sensing line;
(e) determining whether a change in the at least one physical parameter associated with the sensing line at a location thereof has been detected by the distributed sensing unit within a predetermined time period;
(f) triggering an alarm condition indicative of the occurrence of a malfunction in the distributed sensing system, if no change has been detected within the predetermined time period;
(g) if a change has been detected within the predetermined time period, determining whether the change detected is associated with the at least one test cable;
(h) calculating the reaction time of the distributed sensing system, if the change detected is associated with the at least one test cable; and
(I) triggering an alarm condition indicative of the occurrence of a sensing event at a location along the structure being monitored, if the change detected is associated with the at least one sensing cable.

31. The method of claim 30 further comprising, following the performance of the calculating step, the step of de-energizing the at least one change-inducing device to reverse the change in the at least one physical parameter associated with the at least one test cable.

32. The method of claim 31 further comprising, following the performance of the de-energizing step, the step of repeating step (a) through step (i).

33. The method of claim 30 wherein:
the at least one sensing cable includes first, second and third sensing cables;
the at least one test cable includes first and second test cables; and
the first sensing cable being disposed between the distributed sensing unit and the first test cable; the second sensing cable being disposed between the first test cable and the second test cable; the third sensing cable being disposed between the second test cable and the distributed sensing unit.

34. The method of claim 30 wherein:
the at least one change-inducing device includes a first temperature change- inducing device and a second temperature change-inducing device; and
the actuating step includes actuating the first temperature change-inducing device and the second temperature change-inducing simultaneously.

35. The method of claim 30 wherein:
the at least one change-inducing device includes a first temperature change-inducing device and a second temperature change-inducing device; and
the actuating step includes actuating the first temperature change-inducing device and the second temperature change-inducing device at staggered time intervals.

36. The method of claim 30 wherein:
the at least one change-inducing device includes at least one cooling device;
the method further including, following the actuating step, the step of cooling the at least one test cable.

37. The method of claim 30 wherein:
the at least one change-inducing device includes at least one heating device;
the method further including, following the actuating step, the step of heating the at least one test cable.

38. The method of claim 30 wherein:
the at least one change-inducing device includes at least one strain-inducing device;
the method further including, following the actuating step, the step of inducing strain in the at least one test cable.

39. The method of claim 30 wherein the light signals received at the distributed sensing unit are light signals selected from the group consisting of: (i) Raman scattered light signals; (ii) Brillouin scattered light signals; and (iii) Rayleigh scattered light signals.

40. The method of claim 30 wherein the predetermined time period is 120 seconds.

41. A distributed sensing system comprising:
at least one fibre optic sensing cable laid out on or along a structure to be monitored;
a distributed sensing unit for sensing along a sensing line at least one physical parameter associated with the sensing line at a location thereof; the at least one physical parameter being selected from the group consisting of: (a) temperature; (b) strain; and (c) temperature and strain; the distributed sensing system being optically coupled to the at least one sensing cable;
at least one fibre optic test cable optically coupled to the at least one sensing cable to form the sensing line;
at least one device arranged relative to the at least one test cable to induce a first change in the at least one physical parameter associated with the at least one test cable; the first change being detectable by the distributed sensing unit;
a controller configured for autonomously actuating the at least one change-inducing device to thereby test the efficacy and reliability of the distributed sensing unit, the actuating occurring at least one of at randomly selected times, at predetermined times and at predetermined time intervals; and
a relay configured for communication with the distributed sensing unit and the controller;
the relay being operable:
(i) to trigger a first testing-event alarm condition in response to a signal received from the distributed sensing unit indicative of an occurrence of a simulated sensing event if the first change is detected; and
(ii) to trigger a sensing-event alarm condition in response to a signal received from the distributed sensing unit indicative of an occurrence of a sensing event at a location along the structure being monitored if the second change is detected by the distributed sensing unit; the second change including a change in the at least one physical parameter associated with the at least one sensing cable,
wherein the controller is operable to monitor a response of the distributed sensing unit to the change in the at least one physical parameter associated with the at least one test cable and to trigger a second testing-event alarm condition indicative of an occurrence of a malfunction in the distributed sensing system if no change has been detected within a predetermined time period.

42. The distributed sensing system of claim 41 wherein the at least one change-inducing device is selected from the group consisting of: (a) a cooling device;
(b) a heating device; and (c) a strain-inducing devices.

43. The distributed sensing system of claim 41 wherein the at least one test cable cooperates with the at least one change-inducing device to define at least one testing station; the at least one testing station being disposed along the sensing line at a location away from the structure to be monitored.

44. The distributed sensing system of claim 43 wherein:
the at least one physical parameter includes temperature;
the at least one test cable includes first and second test cables;
the at least one temperature change-inducing device includes first and second temperature change-inducing devices;
the first temperature change-inducing device being disposed in heat exchange relation with the first test cable;
the second temperature change-inducing device being disposed in heat exchange relation with the second test cable;
the at least one testing station includes first and second testing stations; the first testing station being defined by the first test cable in cooperation with the first temperature change-inducing device; the second testing station being defined by the second test cable in cooperation with the second temperature change-inducing device;
the first and second testing stations being disposed along the sensing line at different locations.

45. The distributed sensing system of claim 43 wherein:

the at least one physical parameter includes temperature;

the at least one change-inducing device is a single temperature change-inducing device;

the at least one test cable includes a first test cable and a second test cable; and the at least one testing station includes first and second testing stations; the first testing station being defined by the first test cable in cooperation with the single temperature change-inducing device; the second testing station being defined by the second test cable in cooperation with the single temperature change-inducing device.

46. The distributed sensing system of claim 41 wherein:

the at least one sensing cable includes first, second and third sensing cables; and the at least one test cable includes first and second test cables; and the first sensing cable being disposed between the distributed sensing unit and the first test cable; the second sensing cable being disposed between the first test cable and the second test cable; the third sensing cable being disposed between the second test cable and the distributed sensing unit.

47. The distributed sensing system of claim 45 wherein the sensing line is configured for one of single-ended interrogation and double-ended interrogation.

48. The distributed sensing system of claim 41 wherein:

the at least one test cable includes first and second test cables;

the at least one change-inducing device includes first and second cooling devices; and the controller is operable to actuate the first cooling device to cool the first test cable to a first predetermined temperature range and the second cooling device to cool the second test cable to a second predetermined temperature range;

the second predetermined temperature range selected from the group consisting of: (a) a temperature range the same as the first predetermined temperature range; and (b) a temperature range different than the first predetermined temperature range.

49. A distributed sensing system comprising:

at least one fibre optic sensing cable laid out on or along a structure to be monitored;

a distributed sensing unit for sensing along a sensing line at least one physical parameter associated with the sensing line at a location thereof; the at least one physical parameter being selected from the group consisting of: (a) temperature; (b) strain; and (c) temperature and strain; the distributed sensing system being optically coupled to the at least one sensing cable;

at least one fibre optic test cable optically coupled to the at least one sensing cable to form the sensing line;

at least one device arranged relative to the at least one test cable to induce a change in the at least one physical parameter associated with the at least one test cable; the change being detectable by the distributed sensing unit;

a controller configured for autonomously actuating the at least one change-inducing device to thereby test the efficacy and reliability of the distributed sensing unit, the actuating occurring at least one of at randomly selected times, at predetermined times and at predetermined time intervals; and a relay configured for communication with the distributed sensing unit and the controller; the relay being operable to trigger an alarm condition in response to a signal received from the distributed sensing unit indicative that a change in the at least one physical parameter associated with the sensing line at a location thereof has been detected, wherein the controller is operable to monitor a response of the distributed sensing unit to the change in the at least one physical parameter associated with the at least one test cable based on input received from the relay or the lack thereof and to measure a time elapsed between the occurrence of the change in the at least one physical parameter associated with the at least one test cable and a detection thereof by the distributed sensing unit.

* * * * *